United States Patent
Parks et al.

(10) Patent No.: US 12,104,006 B2
(45) Date of Patent: Oct. 1, 2024

(54) POLYOL BLENDS THAT INCLUDE AN ISOPROPYLIDENEDIPHENOL-BASED POLYETHER POLYOL, RELATED COMPOSITIONS AND FOAMS

(71) Applicant: Covestro LLC, Pittsburgh, PA (US)

(72) Inventors: Brandon Parks, McKees Rocks, PA (US); Sharlene Lewis, Pittsburgh, PA (US); Tony Loveday, Weirton, WV (US); Ted Frick, Moon Township, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 17/853,120

(22) Filed: Jun. 29, 2022

(65) Prior Publication Data

US 2024/0002575 A1    Jan. 4, 2024

(51) Int. Cl.
*C08G 18/08* (2006.01)
*C08G 18/12* (2006.01)
*C08G 18/48* (2006.01)
*C08G 18/50* (2006.01)
*C08J 9/12* (2006.01)
*C08G 101/00* (2006.01)

(52) U.S. Cl.
CPC ............ *C08G 18/14* (2013.01); *C08G 18/12* (2013.01); *C08G 18/482* (2013.01); *C08G 18/4837* (2013.01); *C08G 18/4879* (2013.01); *C08G 18/5027* (2013.01); *C08J 9/127* (2013.01); *C08G 2101/00* (2013.01); *C08G 2110/0025* (2021.01); *C08G 2330/00* (2013.01); *C08J 2203/10* (2013.01); *C08J 2203/142* (2013.01); *C08J 2205/10* (2013.01); *C08J 2375/08* (2013.01)

(58) Field of Classification Search
CPC ...... C08G 18/12; C08G 18/14; C08G 18/482; C08G 18/4837; C08G 18/4879; C08G 18/5027; C08G 2101/00; C08G 2110/0025; C08G 2330/00; C08J 9/127; C08J 2203/10; C08J 2203/142; C08J 2205/10; C08J 2375/08
See application file for complete search history.

(56) References Cited

U.S. PATENT DOCUMENTS

| | | | |
|---|---|---|---|
| 3,215,652 A | | 11/1965 | Kaplan |
| 4,757,096 A | * | 7/1988 | Berthevas .......... C08G 18/6535 |
| | | | 521/173 |
| 4,956,439 A | * | 9/1990 | Tong .................. C08G 18/3221 |
| | | | 528/80 |
| 10,253,134 B2 | | 4/2019 | Nefzger et al. |
| 2012/0004334 A1 | * | 1/2012 | Kramer ............. C08G 18/4219 |
| | | | 521/88 |
| 2014/0243560 A1 | | 8/2014 | Lorenz et al. |

FOREIGN PATENT DOCUMENTS

KR    20020065658 A    8/2002

OTHER PUBLICATIONS

U.S. Appl. No. 17/670,727, filed Feb. 14, 2022.
U.S. Appl. No. 17/670,707, filed Feb. 14, 2022.
Ionescu, M.; "Chemistry and Technology of Polyols for Polyurethanes"; 15.3—Bisphenol A Based Polyols; pp. 403-405; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 4—"Oligo-Polyols for Elastic Polyurethanes"; pp. 55-165; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 8—"Polyester Polyols for Elastic Polyurethanes"; pp. 263-294; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 13—"Polyether Polyols for Rigid Polyurethane Foams"; pp. 321-370; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 16—"Polyester Polyols for Rigid Polyurethane Foams"; pp. 419-434; (2005); Rapra Technology Limited; Shawbury, Shrewsbury, Shropshire, SY4 4NR, United Kingdom.
Kulesza, Kamil et al.; "Journal of Analytical and Applied Pyrolysis"; vol. 76; "Thermal decomposition of bisphenol A—based polyetherurethanes blown with pentane Part I—Thermal and pyrolytical studies"; No. 1-2; pp. 243-248; Jun. 1, 2006; Science Direct; Elsevier.
Lewis, Sharlene A. et al.: U.S. Appl. No. 17/185,091, filed Feb. 25, 2021; Title: Isopropylidenediphenol-Based Polyether Polyols, Processes for Their Production, and Foams Produced Therefrom.

* cited by examiner

*Primary Examiner* — John M Cooney
(74) *Attorney, Agent, or Firm* — Donald R. Palladino

(57) ABSTRACT

Polyol blends, isocyanate-reactive compositions, polyurethane foam-forming compositions, methods of producing polyurethane foams, polyurethane foams produced from such compositions and made by such methods. The polyol blends, isocyanate-reactive compositions and polyurethane foam-forming compositions include an isopropylidenediphenol-based polyether polyol in combination with another polyol.

9 Claims, No Drawings

POLYOL BLENDS THAT INCLUDE AN ISOPROPYLIDENEDIPHENOL-BASED POLYETHER POLYOL, RELATED COMPOSITIONS AND FOAMS

FIELD

This specification pertains generally to polyol blends, isocyanate-reactive compositions that include such polyol blends, as well as to related polyurethane foam-forming compositions, polyurethane foams, and articles that include a polyurethane foam. The polyol blends include an isopropylidenediphenol-based polyether polyol.

BACKGROUND

Rigid polyurethane foams are used in many applications. They are produced by reacting a polyisocyanate and an isocyanate-reactive compound, usually a polyol, in the presence of a blowing agent. One use of such foams is as a thermal insulation medium in the construction of refrigerated storage devices, including refrigerated appliances and tractor trailers.

As a result, thermal efficiency, often evaluated with respect to a low thermal conductivity, or "K-factor", is a critically important feature of certain rigid polyurethane foam insulation. Even seemingly relatively small reductions in K-factor, such as on the order of just a few percent, can translate into very significant reductions in energy usage and cost over the lifetime of the device in which the foam is used. For example, according to some estimates, a 2% decrease in K-factor can result in approximately a 1% improvement in energy performance for a refrigerator, which can allow for using a smaller compressor, thus providing significant energy savings over the life of the refrigerator. Alternatively, the thickness of the refrigerator wall or door could be reduced while achieving similar insulation properties, thus allowing for increased internal storage space. As a result, efforts are continuously made to reduce the thermal conductivity of rigid polyurethane foam insulation.

Bisphenol A ("BPA") is used in a wide variety of applications. Raw BPA is processed by purifying the reaction product of acetone and phenol by distillation, wherein a so-called "BPA resin" occurs as a distillation residue. Depending on the intensity of the distillation, this BPA resin can have considerable proportions of 4,4'-isopropylidenediphenol. The remaining proportions are distributed among other structural elements derived from phenol, acetone and Bisphenol A, such as the 2,4'- and 2,2' isomers of the bisphenol base body.

For economic and sustainability reasons, it would be desirable to find useful outlets for such a distillation residue. The successful incorporation of BPA production residues in the production of other products, such as polyurethane foams, would avoid them being disposed of, such as by incineration, thereby conserving the environment and contributing to the reduction in the use of inherently scarce raw materials, and ultimately of crude oil.

SUMMARY

In certain respects, this specification relates to polyurethane foam-forming compositions that comprise a polyol blend, a polyisocyanate, and a blowing agent. The polyol blend comprises 0.1 to 50% by weight, based on the total weight of polyol, of a polyether polyol comprising: (1) an alkoxylate of 4,4'-isopropylidenediphenol; (2) an alkoxylate of 2,4'-isopropylidenediphenol, 2,2'-isopropylidenediphenol, or a mixture thereof, and (3) an alkoxylate of components comprising structural elements which are derived from phenol, acetone, isopropylidenediphenol, or a mixture of any two or more thereof, but which are not isomers of isopropylidenediphenol. The polyisocyanate is present in an amount sufficient to provide an isocyanate index of 0.7 to 1.5.

This specification is also directed to methods for producing polyurethane foams using such compositions, polyurethane foams produced therefrom, and to composite articles comprising such foams and panel insulation that includes such foams.

In other respects, this specification relates to polyol blends. These polyol blends comprise (a) an amine-initiated polyether polyol; and (b) a polyether polyol comprising: (1) an alkoxylate of 4,4'-isopropylidenediphenol; (2) an alkoxylate of 2,4'-isopropylidenediphenol, 2,2'-isopropylidenediphenol, or a mixture thereof, and (3) an alkoxylate of components comprising structural elements which are derived from phenol, acetone, isopropylidenediphenol, or a mixture of any two or more thereof, but which are not isomers of isopropylidenediphenol. Further, in these polyol blends, (a) and (b) are present in the polyol blend in a weight ratio (a):(b) of at least 1:1.

In other respects, this specification relates to isocyanate-reactive compositions that comprise the foregoing polyol blends and a blowing agent, to polyurethane foam-forming compositions that comprise a polyisocyanate and such an isocyanate-reactive composition, to methods for making polyurethane foams using such polyol blends, to related polyurethane foams, and to articles that include such polyurethane foams.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group and may be calculated by dividing the molecular weight of the polyol by its functionality. The equivalent weight of a polyol may also be calculated by dividing 56,100 by the hydroxyl number of the polyol—Equivalent Weight (g/eq)=(56.1×1000)/Hydroxyl number.

Certain implementations of the present specification relate to polyol blends and isocyanate-reactive compositions useful in the production of rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

The rigid foams of this specification are the reaction product of a polyurethane-foam forming composition that includes a polyisocyanate. As used herein, the term "polyisocyanate" encompasses diisocyanates, as well as polyisocyanates of greater functionality than 2.0.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyldiphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain implementations, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

Some aspects of this specification relate to polyol blends. The polyol blends of this specification comprise a polyether polyol that comprises: (a) an alkoxylate of 4,4'-isopropylidenediphenol; (b) an alkoxylate of 2,4'-isopropylidenediphenol, 2,2'-isopropylidenediphenol, or a mixture thereof; and (c) an alkoxylate of components comprising structural elements which are derived from phenol, acetone, isopropylidenediphenol or a mixture of any two or more thereof, but which are not isomers of isopropylidenediphenol. As used herein, the term "isopropylidenediphenol-based polyether polyol" refers to such polyether polyols. In some implementations, the isopropylidenediphenol-based polyether polyol has a functionality of at least 1.5, such as 1.5 to 3, 1.5 to 2.5, 1.5 to 2.0 or 1.5 to 1.7. In some embodiments, the isopropylidenediphenol-based polyether polyol has a viscosity at 25° C. (as determined by ASTM-D4878-15) of no more than 5000 mPa·s, such as 1000 to 5000 mPa·s, 3000 to 5000 mPa·s, 1000 to 4900 mPa·s or 3000 to 4900 mPa·s. In some embodiments, the isopropylidenediphenol-based polyether polyol has a measured hydroxyl number (as determined by ASTM D4274-16) of 100 to 400 mg KOH/g, 200 to 400 mg KOH/g, 200 to 300 mg KOH/g, or 220 to 260 mg KOH/g.

The isopropylidenediphenol-based polyether polyol can be prepared by, for example, placing an H-functional starter composition that comprises a BPA resin comprising (i) 4'-isopropylidenediphenol; (ii) 2,4'- and/or 2,2'-isopropylidenediphenol, and (iii) components comprising structural elements which are derived from phenol, acetone and/or isopropylidenediphenol, but which are not isomers of isopropylidenediphenol, into a stirred autoclave, together with any other desired H-functional starters and a suitable catalyst, and by metering alkylene oxide in at an elevated temperature.

In some implementations, the BPA resin is a composition that occurs as a distillation residue during the production of BPA. In some implementations, the BPA resin comprises: (i) at least 10% by weight, such as 10 to 60% by weight, of 4,4'-isopropylidenediphenol; (ii) at least 5% by weight, such as 10 to 40% by weight of 2,4'- and/or 2,2'-isomers of the bisphenol base body; and (iii) at least 10% by weight, such as 10 to 60% by weight, of a compound with a chromane and/or indane base body, wherein each such weight percent is based on the total weight of the BPA resin. Exemplary such compounds with a chromane and/or indane base body are, without limitation, 4-(2,2,4-trimethyl-3.4-dihydro-2H-chromen-4-yl)phenol, which has the Structure (1), 4-(2,4,4-trimethyl-3-4-dihydro-2H-chromen-2-yl)phenol, which has the Structure (2), 3-(4-hydroxyphenyl)-1,1,3-trimethyl-2H-inden-5-ol, which has the Structure (3), and 1-(4-hydroxyphenyl)-1,3,3-trimethyl-2H-inden-5-ol, which has the Structure (4), in which:

Structure (1) is 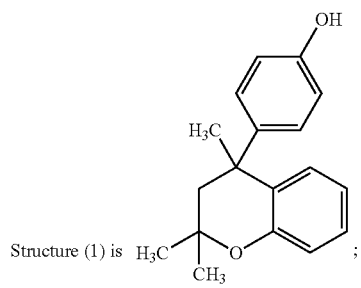;

Structure (2) is 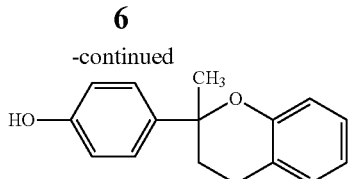;

Structure (3) is 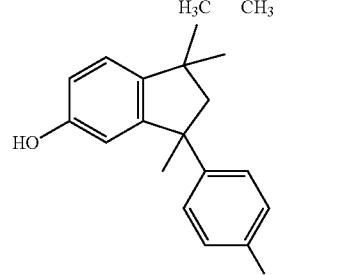 OH; and

Structure (4) is 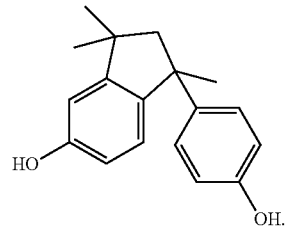 OH.

As noted earlier, in addition to the BPA resin, other H-functional starters may be used in the preparation of the isopropylidenediphenol-based polyether polyol. For example, in some implementations, the H-functional starter composition further comprises a diol having a molecular weight less than the molecular weight of isopropylidenediphenol and that does not contain structural elements derived from phenol, acetone and/or isopropylidenediphenol. Examples of such diols include, without limitation, ethylene glycol (molar mass of 62 g/mol), propylene glycol (molar mass of 76 g/mol), dipropylene glycol (molar mass of 134 g/mol), diethylene glycol (molar mass of 106 g/mol), 1,2-diphenyl-ethane-1,2-diol (molar mass of 214 g/mol), triethylene glycol (molar mass of 150 g/mol), butylene glycol (molar mass of 90 g/mol), cyclohexanediol (molar mass of 116 g/mol), cyclohexane-1,4-dimethanol (molar mass of 144 g/mol), pentanediol (molar mass of 104 g/mol), hexanediol (molar mass of 118 g/mol), neopentyl glycol (molar mass of 104 g/mol), as well as mixtures of any two or more thereof. In some implementations, such a diol is selected that has a molar mass of less than 150 g/mol, less than 100 g/mol, or, in some cases, less than 80 g/mol.

In some implementations, the foregoing diol with a molecular weight less than the molecular weight of isopropylidenediphenol and that does not contain structural elements derived from phenol, acetone and/or isopropylidenediphenol is present in an amount of 0.1 to 20% by weight, 0.1 to 10% by weight, 1 to 5% by weight, or 1 to 3% by weight, based on the total weight of the H-functional starter composition employed to prepare the isopropylidenediphenol-based polyether polyol. In some of these implementations, the BPA resin is present in an amount of 80 to 99.9% by weight, 90 to 99.9% by weight, 95 to 99% by weight, or 97 to 99% by weight, based on the total weight of the H-functional starter composition employed to prepare the isopropylidenediphenol-based polyether polyol. In some implementations, the BPA resin is present in an amount of 30 to 60% by weight, 40 to 50% by weight, or, in some cases, 43 to 48% by weight, based on the total weight of the isopropylidenediphenol-based polyether polyol.

To form the isopropylidenediphenol-based polyether polyol, the H-functional starter composition is reacted with an alkylene oxide. Suitable alkylene oxides include, for example, ethylene oxide, propylene oxide, and butylene oxide, among others, includes mixtures of any two or more thereof. The alkylene oxides may be added as mixtures or added sequentially. When used in a mixture, ethylene oxide can be added into the backbone (i.e. polyol is terminated with propylene oxide) or can be added to give an ethylene oxide cap.

In some implementations, however, the alkoxylation reaction is conducted so as to result in an isopropylidenediphenol-based polyether polyol comprising an internal block comprising polymerized ethylene oxide moieties and an external cap comprising polymerized propylene oxide moieties. To produce such a propylene oxide-capped isopropylidenediphenol-based polyether polyol, the H-functional starter composition may be reacted with a first portion of alkylene oxide, in the presence of a catalyst, to form an intermediate polymer having hydroxyl end-group(s), and the intermediate polymer reacted with a second portion of alkylene oxide to form the isopropylidenediphenol-based polyether polyol.

More specifically, in some cases, a first portion of alkylene oxide comprises ethylene oxide and a second portion comprises propylene oxide. For example, in some cases, the first portion of alkylene oxide may comprise ethylene oxide and, if desired, include other alkylene oxides besides ethylene oxide, such as, without limitation, propylene oxide, 1,2-butylene oxide, or 2,3-butylene oxide, styrene oxide, or a mixture of any two or more thereof. In some implementations, however, the first portion of alkylene oxide consists predominantly, or, in some cases, exclusively of ethylene oxide. Thus, in these implementations, ethylene oxide is present in the first portion of alkylene oxide in an amount of at least 50% by weight, at least 80% by weight, at least 90%, at least 95% by weight, or, in some cases, 100% by weight, based on the total weight of the first portion of alkylene oxide. Thus, in these implementations, the resulting isopropylidenediphenol-based polyether polyol comprises an internal block comprising polymerized ethylene oxide moieties, wherein the ethylene oxide moieties are present in an amount of least 50% by weight, at least 80% by weight, at least 90%, at least 95% by weight, or, in some cases, 100% by weight, based on the total weight of the polymerized alkylene oxide moieties of the internal block of the isopropylidenediphenol-based polyether polyol.

In addition, in some implementations, the second portion of alkylene oxide consists predominantly, or, in some cases, exclusively of propylene oxide. Thus, in these implementations, propylene oxide is present in the second portion of alkylene oxide in an amount of at least 50% by weight, at least 80% by weight, at least 90%, at least 95% by weight, or, in some cases, 100% by weight, based on the total weight of the second portion of alkylene oxide. Thus, in these implementations, the resulting isopropylidenediphenol-based polyether polyol comprises an external cap comprising polymerized propylene oxide moieties, wherein the propylene oxide moieties are present in an amount of least 50% by weight, at least 80% by weight, at least 90%, at least 95% by weight, or, in some cases, 100% by weight, based on the total weight of the polymerized alkylene oxide moieties of the external cap of the isopropylidenediphenol-based polyether polyol.

In some embodiments, ethylene oxide is present in an amount of at least 50% by weight or at least 60% by weight, based on the total amount of alkylene oxide used. In some of these implementations, the remainder of the alkylene oxide used may consist predominantly or exclusively of propylene oxide and, as a result, in some implementations, propylene oxide is present in an amount of up to 50% by weight or up to 40% by weight, based on the total weight of alkylene oxide that is used to produce the isopropylidenediphenol-based polyether polyol.

Furthermore, in some embodiments, polymerized propylene oxide moieties of the external cap are present in an amount of at least 20% by weight, such as 20 to 50% by weight, 20 to 40% by weight, 30 to 40% by weight, or 35 to 40% by weight, based on the total weight of polymerized alkylene oxide moieties in the isopropylidenediphenol-based polyether polyol. Thus, in some cases, little or no propylene oxide moieties are present in the internal block.

In some implementations, the molar ratio of BPA resin to ethylene oxide-containing alkylene oxide mixture is chosen such that, per phenolic hydroxyl group, at least 1.5 mols of alkylene oxide are used.

Suitable catalysts that may be used for the foregoing alkoxylation include tertiary amines with aliphatic, cycloaliphatic, aromatic and/or araliphatic residues bound to the nitrogen atom, and/or aromatic amines wherein the nitrogen atom may also be a part of a ring system and/or wherein the nitrogen atom may be part of an aromatic system. Also suitable are hydroxides or oxides of alkali and earth alkaline metals.

Specific examples of suitable catalysts include, for example, triethylenediamine, n,n-dimethylcyclohexylamine, 1-methyl-4-dimethylaminoethyl-piperazine, triethylamine, tributylamine, n,n-dimethylbenzylamine, dicyclohexylmethylamine, n,n',n"-tris-(dimethylamino-propyl)hexahydrotriazine, tris-(dimethylaminopropyl)amine, tris(dimethylaminomethyl)phenol, dimethylaminopropylformamide, n,n,n',n'-tetramethylethylenediamine, n,n,n',n'-tetramethylbutanediamine, n,n,n',n'-tetramethylhexanediamine, pentamethyldiethylenetriamine, pentamethyldipropylenetriamine, tetramethyldiaminoethylether, n,n'-dimethylpiperazine, 1-azabicyclo[3.3.0]octane, bis-(dimethylaminopropyl)-urea, n-methylmorpholine, n-ethylmorpholine, n-cyclohexylmorpholine, 2,3-dimethyl-3,4,5,6-tetrahydropyrimidine, triethanolamine, triisopropanolamine, n-methyldiethanolamine, n-ethyldiethanolamine, n,n-dimethylamineoethanol and tris-(n n-di-methylaminopropyl)-s-hexahydrotriazine, 1,2-dimethylimidazole, n-methylimidazole, imidazole and/or n,n-dimethylamineopyridine. Suitable hydroxides of the alkali and earth alkaline metals are lithium-sodium-. potassium-, rubidium-, caesium-, magnesium-, calcium-, strontium- and barium hydroxides.

In some implementations, sodium hydroxide and/or potassium hydroxide catalyst is used at a concentrations of 50 to 5000 ppm, 1000 to 5000 ppm, or 4000 to 5000 ppm.

In some implementations, the BPA resin is used at an elevated temperature of, for example, 50 to 100° C., already with the employed catalyst, and atmospheric oxygen is replaced with nitrogen by repeated evacuation followed by ventilation. If desired, the alkoxylation reaction takes place at an elevated temperature, such as 70 to 140° C. or 90 to 130° C. A solvent can be used in the process if desired. The temperature of the exothermic alkylene oxide addition reaction can be maintained at the desired level by cooling, if desired or necessary.

The addition of the alkylene oxide to the H-functional starter composition is usually conducted continuously over a period of, for example, 2 to 20 hours. However, as previously indicated, in some implementations, the alkylene oxide is added in at least two portions as described above. In these implementations, the process comprises a step in which ethylene oxide is either homopolymerized or copolymerized with the H-functional starter composition, often in the presence of a catalyst as described above. In some implementations of this step, ethylene oxide is present in an amount of at least 50% by weight, at least 80% by weight, at least 90%, at least 95% by weight, or 100% by weight, based on the total weight of alkylene oxide employed.

In some cases, the polymerization of the ethylene oxide is carried out at a temperature of 30° to 150° C. or 100 to 120° C. The reaction pressure may be atmospheric, subatmospheric, or above atmospheric. The polymerization may be carried out in an inert solvent, if desired, such as an aromatic hydrocarbon. In some implementations, the H-functional starter composition is stirred and the alkylene oxide added in a continuous fashion to the mixture.

After polymerization of the first portion of alkylene oxide to form the internal block, in some embodiments, the resulting intermediate polymer is reacted with a second proportion of alkylene oxide to yield an end-capped polyether polyol. In some implementations of this step, propylene oxide is present in an amount of at least 50% by weight, at least 80% by weight, at least 90%, at least 95% by weight, or, in some cases, 100% by weight, based on the total weight of alkylene oxide employed in the second portion of alkylene oxide to react with the intermediate polymer.

The reaction conditions employed during the end-capping step may be the same as or similar to those used to form the internal block. Removal of ethylene oxide remaining after formation of the internal block prior to the end-capping step may be conducted, if desired.

The amount of propylene oxide to be added to produce the end-cap can vary. However, as mentioned earlier, in some cases, polymerized propylene oxide moieties of the external cap are present in an amount of at least 20% by weight, such as 20 to 50% by weight, 20 to 40% by weight, or 30 to 40% by weight, or 35 to 40% by weight, based on the total weight of polymerized alkylene oxide moieties in the isopropylidenediphenol-based polyether polyol.

After the end-capping step, a secondary reaction may follow to complete the reaction. This generally happens in several, such as 5 to 30, hours. After the secondary reaction time expires, a vacuum step can take place to remove residues of epoxides from the reaction mixture that may not have reacted. This vacuum step can be carried out at, for example, an absolute pressure of 500 mbar to 10 mbar over a period of 0.1 to 5 hours. The removal of traces of unreacted epoxides or other odor-forming, volatile, organic compounds can also be aided by stripping after the secondary reaction phase and, if desired, also after the vacuum step. During stripping, volatile components are removed, such as residual alkylene oxides or secondary components from the BPA resin that could not be alkoxylated, by introducing inert gases and/or steam into the liquid phase while simultaneously applying a vacuum, such as by passing inert gas and/or steam through at an absolute pressure of 5 mbar to 500 mbar. Alternatively, the introduction of steam can also be produced by the direct introduction of water under the surface of the liquid, such as at a temperature of >100° C. and an absolute pressure of 5 mbar to 500 mbar. The quantity of water introduced, or, respectively, the quantity of steam introduced can be determined empirically, and is sometimes between 10 and 30% by weight of water or steam, based on the total weight of the polyether polyol to be purified. The removal of volatile components, either in the vacuum and/or by stripping, may take place at a temperature of, for example, 20° C. to 200° C. or 50° C. to 160° C., often while stirring. The stripping process can also be performed in so-called stripping columns in which an inert gas- or steam flow is passed in counterflow by the product flow, such columns often being columns with fittings or being packed columns. In these columns, the transportation of the volatile auxiliary components is accelerated in the gas phase by enlarging the contact surface between liquid and gas space. In some implementations, stripping is carried out with steam or water, if necessary accompanied by the introduction of inert gas(es). U.S. Patent App. Pub. No. 2014/0243560 A1 at [0017]-[0048], the cited portion of which being incorporated herein by reference, describes reaction conditions and apparatus suitable for carrying out the alkoxylation process described herein.

In some implementations, the isopropylidenediphenol-based polyether polyol is present in an amount of 0.1 to 50% by weight, based on the total weight of polyol that is present. More specifically, in some of these implementations, the isopropylidenediphenol-based polyether polyol is present in an amount of at least 1% by weight, at least 5% by weight or at least 10% by weight and/or no more than 40% by weight, no more than 35% by weight, or no more than 30% by weight, based on the total weight of polyol that is present.

The polyol blends of this specification comprise another polyol, in some cases another polyether polyol, in addition to the isopropylidenediphenol-based polyether polyol. More specifically, in some implementations, the polyol blend comprises an amine-initiated polyether polyol. As used herein, "amine-initiated polyether polyol" refers a polyether polyol that is the reaction product of an alkylene oxide with an H-functional starter comprising an amine group-containing compound. In some implementations, the amine group-containing compound contains primary and/or secondary amine groups, and, in some cases, may be free of tertiary amine groups. Such compounds may also contain one or more hydroxyl groups.

The amine group-containing compound may comprise, for example, an aliphatic, aliphatic, or aromatic amine, or a mixture of any two or more thereof. Examples of suitable aliphatic amines are, for example, monoethanolamine, diethanolamine, methyl amine, ethylene diamine, and diethylene triamine, as well as a mixture of any two or more thereof.

In some cases, however, the amine-initiated polyether polyol comprises an aromatic amine-initiated polyether polyol. As used herein, "aromatic amine-initiated polyether polyol" refers to a polyether polyol that is the reaction product of an H-functional starter comprising an aromatic amine, such as toluenediamine ("TDA"), and alkylene oxide.

In certain implementations, the aromatic amine employed has an amine functionality of at least 1, such as 1 to 3 or 1 to 2. Specific examples of suitable aromatic amines which can be used include crude TDA obtained by the nitration of toluene followed by reduction; 2,3-TDA, 3,4-TDA, 2,4-TDA, 2,6-TDA or mixtures thereof; aniline; 4,4'-methylene dianiline; methylene-bridged polyphenyl polyamines composed of isomers of methylene dianilines and triamines or polyamines of higher molecular weight prepared by reacting aniline with formaldehyde by methods known in the art. In some implementations, a mixture composed of 2,3-TDA and 3,4-TDA (commonly referred to as "o-TDA") is used.

In addition to the aromatic amine, other H-functional starters may also be used to prepare the aromatic amine-initiated polyether polyol. These other H-functional starters include, for example, water, propylene glycol, glycerin, ethylene glycol, ethanol amines, diethylene glycol, or a mixture of any two or more thereof. As will be appreciated, it is possible to use a wide variety of individual starters in combination with one another. In some implementations, however, aromatic amine is the predominant or essentially sole H-functional starter used to produce the aromatic amine-initiated polyether polyol. This means that, in these implementations, aromatic amine is present in an amount of more than 50% by weight, such as at least 80% by weight, at least 90% by weight, or even 100% by weight, based on the total weight of H-functional starter used to produce the aromatic amine-initiated polyether polyol.

A variety of alkylene oxides may be used to produce the aromatic amine-initiated polyether polyol, such as ethylene oxide, propylene oxide, butylene oxide, amylene oxide and mixtures thereof. The alkylene oxides may be added individually, sequentially one after the other to form blocks or in a mixture to form a heteric polyether. The aromatic amine-initiated polyether polyols may have primary or secondary hydroxyl end groups. In some implementations, propylene oxide is the primary or essentially sole alkylene oxide used to prepare the aromatic amine-initiated polyether polyol. This means that, in these implementations, propylene oxide is used in an amount of more than 50% by weight, such as at least 80% by weight, at least 90% by weight, or even 100% by weight, based on the total weight of alkylene oxide used to prepare the aromatic amine-initiated polyether polyol. In some implementations, ethylene oxide is employed in a relatively small amount. In these implementations, ethylene oxide is used in an amount of no more than 10% by weight, no more than 5% by weight, no more than 1% by weight, or, in some cases, 0% by weight, based on the total weight of alkylene oxide used to prepare the aromatic amine-initiated polyether polyol.

In some implementation, the amine-initiated polyether polyol, such as the aromatic amine-initiated polyether polyol, has a hydroxyl number of 200 to 600 mg KOH/g and a functionality of at least 2.5. In some implementations, such amine-initiated polyether polyol has a hydroxyl number of 200 to 600 mg KOH/g, 300 to 500 mg KOH/g, 350 to 450 mg KOH/g, or, in some cases, 380 to 420 mg KOH/g. In some implementations, such amine-initiated polyether polyol has and a functionality of 2.5 to 6, 3 to 5, 3.5 to 4.5, 3.8 to 4.2 or 4.0.

In some implementations, the foregoing aromatic amine-initiated polyether polyol is present in an amount of at least 20% by weight, based on the total weight of polyol that is present. More specifically, in some of these implementations, the foregoing aromatic amine-initiated polyol is present in an amount of at least 30% by weight or at least 40% by weight and/or no more than 99% by weight, no more than 80% by weight, no more than 70% by weight no more than 60% by weight, or, in some cases, no more than 50% by weight, based on the total weight of polyol that is present.

The polyol blends of this specification may include other polyols. For example, in some implementations, the polyol blend also includes a saccharide-initiated polyether polyol. As used herein, "saccharide-initiated polyether polyol" refers to a polyether polyol that is the reaction product of an H-functional starter comprising saccharide with alkylene oxide. Examples of suitable alkylene oxides include ethylene oxide, propylene oxide, butylene oxide, styrene oxide, epichlorohydrin, or a mixture of any two or more thereof. Some examples of suitable saccharide initiators are sucrose, sorbitol, maltitol, etc. as well as other mono-saccharides, di-saccharides, tri-saccharides and polysaccharides. Other initiator compounds are often used in combination with the saccharide initiator to prepare the saccharide-initiated polyether polyol. Saccharides can be co-initiated with for example, compounds such as water, propylene glycol, glycerin, ethylene glycol, ethanol amines, diethylene glycol, or a mixture of any two or more thereof. As will be appreciated, it is possible to use a wide variety of individual initiator compounds in combination with saccharide initiator.

In some implementations, saccharide is the predominant H-functional starter used to produce the saccharide-initiated polyether polyol. This means that, in these implementations, saccharide is present in an amount of more than 50% by weight, such as at least 70% by weight or at least 80% by weight, based on the total weight of H-functional starter used to produce the saccharide-initiated polyether polyol.

In some implementations, propylene oxide is the primary or essentially sole alkylene oxide used to prepare the saccharide-initiated polyether polyol. This means that, in these implementations, propylene oxide is used in an amount of more than 50% by weight, such as at least 60% by weight, or at least 70% by weight, based on the total weight of alkylene oxide used to prepare the saccharide-initiated polyether polyol. In some implementations, ethylene oxide is employed in a relatively small amount. Thus, in these implementations, ethylene oxide is present in an amount of no more than 50% by weight, such as no more than 40% by weight, or, in some cases, no more than 30% by weight, based on the total weight of alkylene oxide used to prepare that saccharide-initiated polyether polyol.

In some implementations, the saccharide-initiated polyether polyol has a hydroxyl number of from 200 to 600 mg KOH/g, such as 300 to 550 mg KOH/g, such as 300 to 500 mg KOH/g, or, in some cases, 350 to 500 mg KOH/g, and a functionality of 4 to 6, such as 5 to 6, or to 6.0.

In some implementations, the saccharide-initiated polyether polyol is present in an amount of at least 20% by weight, based on the total weight of polyol that is present. More specifically, in some implementations, the saccharide-initiated polyol is present in an amount of at least 25% by weight or at least 30% by weight and/or no more than 80% by weight, no more than 70% by weight, no more than 60% by weight no more than 50% by weight, or, in some cases, no more than 40% by weight, based on the total weight of polyol that is present.

Further additional polyols may be present in the polyol blend if desired. For example, in some implementations, the polyol blend may comprise a polyester polyol, such as an aromatic polyester polyol. Suitable aromatic polyester polyols include, for example, the reaction product of an aromatic diacid or anhydride with a suitable glycol or triol. For example, polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, phthalic anhydride, or a mixture of any two or more thereof. Some of examples of the suitable aromatic polyester polyols include those compounds which are available from Stepan Chemical under the Stepanpol trade name such as, for example, Stepanpol® PS 3024 and Stepanpol PS 2502A or from Invista under the Terate trade name, such as Terate® HT-5100 and HT-5500, or from Coim under the Isoexter trade name such as Isoexter® TB-265.

In certain implementations, the aromatic polyester polyol has a hydroxyl number of 150 to 410 mg KOH/g, such as 150 to 360 mg KOH/g, such as 200 to 335 mg KOH/g, or, in some cases, 200 to 250 mg KOH/g, and a functionality of 1.5 to 3, such as 1.9 to 2.5.

In some cases, the aromatic polyester polyol may be utilized in an amount of 1 to 25%, based on total weight of polyol that is present. In some implementations, the aromatic polyester polyol is present in an amount of 5 to 25% by weight, 5 to 20% by weight, or 10 to 20% by weight, based upon the total weight of the polyol that is present.

In other embodiments, however, the polyol blend may be substantially free or, in some cases, completely free of aromatic polyester polyol or other polyester polyols. In fact, it was a surprising discovery that the isopropylidenediphenol-based polyether polyol described in this specification could be effectively used as a 1:1 replacement for such a polyester polyol in polyol blends and polyurethane foam-forming compositions of the type described in this specification to produce polyurethane foams exhibiting similar, or in some cases even superior, insulation performance while still providing other comparable properties, such as reactivity, free-rise density, and foam flow. As used herein, "substantially free" when used with reference to the absence of polyester polyol in the polyol blend, means that the polyester polyol is present in an amount of less than 1% by weight, less than 0.5% by weight, or less than 0.1% by weight, based on the total weight of polyol that is present.

In certain implementations, the aromatic amine-initiated polyether polyol (a) and the isopropylidenediphenol-based polyether polyol (b) are present in the polyol blend in a weight ratio (a):(b) of at least 1:1, such as 1:1 to 1000:1, 1:1 to 500:1, 1:1 to 100:1, 1:1 to 50:1, 1:1 to 10:1, 1:1 to 5:1, 1:1 to 4:1 or, in some cases, 1.5 to 3.5:1. In certain implementations, the aromatic amine-initiated polyether polyol (a) and the saccharide-initiated polyether polyol (c) are present in a weight ratio (a):(c) of 1:2 to 2:1, 0.7:1 to 1:0.7 or 0.9:1 to 1:0.9. In certain implementations, the saccharide-initiated polyether polyol (c) and isopropylidenediphenol-based polyether polyol (b) are present in a weight ratio (c):(b) of 1:1 to 1000:1, 1:1 to 500:1, 1:1 to 100:1, 1:1 to 50:1, 1:1 to 10:1, such as 2:1 to 5:1 or, in some other cases, 1.1:1 to 2:1.

If desired, the polyol blend may include additional compounds that contain isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, and diethyltoluenediamine.

In certain implementations, the polyol blend has a weighted average functionality from 3 to 5, such as 3 to 4.5 or 3.5 to 4.0, and/or a weighted average hydroxyl number of from 300 to 500 mg KOH/g, such as 300 to 450 mg KOH/g, 300 to 400 mg KOH/g or 340 to 400 mg KOH/g. In certain embodiments, the polyol blend is present in the polyurethane foam-forming composition in an amount of at least 50% by weight, such as 50 to 90% by weight or 60 to 80% by weight, based on the total weight of the polyurethane foam-forming composition except for the weight of the polyisocyanate.

In some implementations, the sum of the amount of the isopropylidenediphenol-based polyether polyol, the aromatic amine-initiated polyether polyol, and the saccharide-initiated polyether polyol, is at least 90% by weight, such as at least 95% by weight, at least 98% by weight, or, in some cases, 100% by weight, based on the total weight of polyol that is present.

Further, in some implementations, the polyol blend does not include any filled polyol. As will be appreciated, a "filled polyol" is a dispersion of polymer particles in a base polyol. Examples of filled polyols, any or all of which are excluded from use in the some implementations of the polyol blends employed in the inventions disclosed herein, are "polymer polyols", in which the polymer particles comprise a polymer comprising the free radical polymerization reaction product of an ethylenically unsaturated compound, "PIPA polyols", in which the polymer particles comprise a polyisocyanate polyaddition polymer comprising the reaction product of a polymerizable composition comprising an isocyanate and an alkanolamine, and "PHD polyols" in which the polymer particles comprise a polyhydrazodiconamide comprising the reaction product of a reaction mixture comprising an isocyanate and a diamine and/or a hydrazine.

As mentioned earlier, some implementations of the inventions of this specification relate to isocyanate-reactive compositions that include, in addition to the polyol blend, a blowing agent. For example, in some implementations, the isocyanate-reactive compositions, and polyurethane foam-forming compositions, of this specification comprise a physical blowing agent composition. More specifically, in some cases, the physical blowing agent comprises a halogenated blowing agent, such as, for example, fluorocarbons, including chlorofluorocarbons ("CFCs"), hydrofluorocarbons ("HFCs") and hydrochlorofluorocarbons ("HCFCs"), and halogenated olefins, such as hydrofluoroolefins ("HFOs"), including hydrochlorofluoroolefins ("HCFOs"). Suitable HCFOs include 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some implementations, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

Other suitable physical blowing agents include other halogenated blowing agents, such as CFCs, HCFCs, HFCs, other HFOs (aside from HCFO) and/or hydrocarbon blowing agents, such as butane, n-pentane, cyclopentane, hexane, and/or isopentane (i.e., 2-methylbutane). In other embodiments, however, the isocyanate-reactive composition is substantially or, in some cases, completely free, of such other physical blowing agents. Therefore, in some implementations, the HCFO is present in amount of at least 80% by weight, such as at least 90% by weight, at least 95% by weight, at least 99% by weight or, in some cases 100% by weight, based on the total weight of the physical blowing agent in the blowing agent composition. In other implementations, however, a hydrocarbon, such as cyclopentane, is the primary or essentially sole physical blowing agent present in the isocyanate-reactive composition. This means that, in these implementations, a hydrocarbon, such as cyclopentane, is present in an amount of more than 50% by weight, such as at least 60% by weight, at least 70% by weight, at least 80% by weight, at least 90% by weight, or 100% by weight, based on the total weight of physical blowing agent present in the isocyanate-reactive composition.

In some implementations, the physical blowing agent, such as HFO or HCFO, is utilized in an amount of at least 10% by weight, such as 10 to 30% by weight or 15 to 30% by weight or 15 to 25% by weight, based on the total weight of the polyurethane foam-forming composition except for the weight of the polyisocyanate.

In some implementations, in addition to the foregoing physical blowing agent, the isocyanate-reactive compositions and polyurethane foam-forming compositions of this specification also include water, which acts as a carbon dioxide generating chemical blowing agent. Specifically, in some cases, water is utilized in an amount of at least 0.5 to 5% by weight, such as 1.0 to 5.0% by weight, such as 1.0 to 4.0% by weight, or 1.0 to 3.0% by weight, or 1.0 to 2.0% by weight, based on the total weight of the polyurethane foam-forming composition except for the weight of the polyisocyanate. In certain implementations, the physical blowing agent composition and the water are present in a relative ratio, by weight, of at least 5:1, such as 5:1 to 50:1, 5:1 to 20:1 or, in some cases, 10:1 to 20:1.

The polyurethane foam-forming composition also typically comprises a surfactant. Suitable surfactants include, for example, organosilicon compounds, such as polysiloxane-polyalkyene-block copolymers, such as a polyether-modified polysiloxane. Other possible surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some implementations, surfactant is utilized in an amount of 0.2 to 5.0% by weight, such as 1 to 3% by weight, based on the total weight of the polyurethane foam-forming composition except for the weight of the polyisocyanate.

The polyurethane foam-forming compositions of this specification also typically comprise a catalyst, such as a tertiary amine, tertiary phosphine, a metal chelate, an acid metal salt, a strong base, a metal alcoholate and/or phenolate, a metal salt of an organic acid, or a combination thereof. In some implementations, the catalyst comprises an organotin catalyst and/or tertiary amine catalyst. For example, in some cases, a combination of at least one "blowing" catalyst, which strongly promotes the reaction of an isocyanate group with a water molecule to form carbon dioxide, and either at least one "gelling" catalyst, which strongly promotes the reaction of an alcohol group with an isocyanate to form the urethane, or at least one trimerization catalyst, may be used.

Specific examples of suitable tertiary amine catalysts include: pentamethyldiethylenetriamine, N,N-dimethylcyclohexylamine, N,N',N''-tris(3-dimethylaminopropyl-)hexahydrotriazine, tetramethylethylenediamine, tetraethylene diamine, benzyldimethylamine or a combination thereof. In certain embodiments, the tertiary amine catalyst includes pentamethyldiethylenetriamine, N,N',N''-dimethylaminopropyl-hexahydrotriazine, N,N-dimethylcyclohexylamine, or a combination thereof. Specific examples of suitable organometallic catalysts include dibutyltin dilaurate, dibutyltin diacetate, stannous octoate, potassium octoate, potassium acetate, potassium 2-ethylhexanoate, or a combination thereof. In some implementations, catalyst is present in an amount of 0.01 to 3.0% by weight or 0.3 to 2.5% by weight, based on the total weight of the polyurethane foam-forming composition except for the weight of the polyisocyanate.

Additional materials which may optionally be included in the foam-forming compositions of the present invention include pigments, colorants, fillers, antioxidants, flame retardants, and stabilizers. Exemplary flame retardants useful in the foam-forming composition of the present invention include, but are not limited to, reactive bromine-based compounds known to be used in polyurethane chemistry and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

This specification is also directed to processes for producing rigid polyurethane foams. In such processes, a polyisocyanate is reacted with an isocyanate-reactive composition comprising the polyol blend. In some implementations, the isocyanate functional component and the polyol blend are mixed at an isocyanate index of from 0.7 to 1.5, 1.0 to 1.5, 1.1 to 1.5, or 1.2 to 1.4.

The polyol blend is reacted with a polyisocyanate in the presence of the blowing agent composition, the catalyst composition, a surfactant and any other optional ingredients. The rigid foams may be prepared by blending all of the polyurethane foam-forming composition components, except for the polyisocyanate, together in a phase stable mixture, and then mixing this mixture in the proper ratio with the polyisocyanate. Alternatively, one or more of the components, such as the surfactant, may be combined with the polyisocyanate prior to mixing it with the polyol blend. Other possible implementations would include adding one or more of the components as a separate stream, together with the polyol blend and polyisocyanate. As used herein, the term phase stable means that the composition does not visibly separate when stored for 7 days at about 70° F. (or 21° C.).

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the foam-forming mixture but requires that the isocyanate reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added, and the components are allowed to react together in the presence of the blowing agent and other appropriate additives such as the catalysts, and surfactants. Other additives may be added to either the isocyanate prepolymer or remaining polyol or both prior to the mixing of the components, whereby at the end of the reaction, rigid foam is provided.

Furthermore, the rigid foam can be prepared in a batch or continuous process by the one-shot or quasi-prepolymer methods using any well-known foaming apparatus. The rigid foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid foam. Thus, high closed-cell content in the foam is desirable. In some implementations, the rigid foams produced according to implementations of this specification have a closed-cell content of more than 80 percent, more than 85 percent, or more than 88 percent, as measured according to ASTM D6226-15. Furthermore, the thermal conductivity of foams produced according to various implementations of the present specification indicates that the foams have acceptable insulating properties, i.e., the foams have a thermal conductivity measured at 35° F. (2° C.) of less than 0.126 BTU-in/h-ft$^2$-° F. and measured at 75° F. (24° C.) of no more than 0.140 BTU-in/h-ft$^2$-° F. for foam generated using predominantly an HCFO or HFO as the physical blowing agent or have a thermal conductivity measured at 35° F. (2° C.) of less than 0.132 BTU-in/h-ft$^2$-° F. and measured at 75° F. (24° C.) of no more than 0.144 BTU-in/h-ft$^2$-° F. for foam generated using predominantly a hydrocarbon as the physical blowing agent, in each case determined from the core of 2-inch thick panels, as measured according to ASTM C518-15.

This specification also relates to the use of the rigid foams described herein for thermal insulation. That is, the rigid foams of the present specification may find use as an insulating material in refrigeration apparatuses. These rigid foams can be used, for example, as an intermediate layer in composite elements or for filling hollow spaces of refrigerators, freezers, or refrigerated trailers. These foams may also find use in the construction industry or for thermal insulation of long-distance heating pipes and containers.

As such, the present invention also provides a composite article comprising rigid foam as disclosed herein sandwiched between one or more facer substrates. In certain implementations, the facer substrate may be plastic (such a polypropylene resin reinforced with continuous bi-directional glass fibers or a fiberglass reinforced polyester copolymer), paper, wood, or metal. For example, in certain implementations, the composite article may be a refrigeration apparatus such as a refrigerator, freezer, or cooler with an exterior metal shell and interior plastic liner. In certain implementations, the refrigeration apparatus may be a trailer, and the composite article may include the foams produced according to the present invention in sandwich composites for trailer floors or sidewalls.

Various aspects of the subject matter described herein are set out in the following numbered clauses:

Clause 1. A polyurethane foam-forming composition comprising: (a) a polyol blend comprising 0.1 to 50% by weight, based on the total weight of polyol, of an isopropylidenediphenol-based polyether polyol comprising: (1) an alkoxylate of 4,4'-isopropylidenediphenol; (2) an alkoxylate of 2,4'-isopropylidenediphenol, 2,2'-isopropylidenediphenol, or a mixture thereof, and (3) an alkoxylate of components comprising structural elements which are derived from phenol, acetone, isopropylidenediphenol, or a mixture of any two or more thereof, but which are not isomers of isopropylidenediphenol; (b) a blowing agent; and (c) a polyisocyanate that is present in an amount sufficient to provide an isocyanate index of 0.7 to 1.5.

Clause 2. The polyurethane foam-forming composition of clause 1, wherein the polyisocyanate comprises m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, 3,3'-dimethyl-diphenyl-propane-4,4'-diisocyanate, 2,4,6-toluene triisocyanate, 4,4'-dimethyl-diphenylmethane-2,2',5,5'-tetraisocyanate, a polymethylene polyphenyl-polyisocyanate, or a mixture of any two or more thereof.

Clause 3. The polyurethane foam-forming composition of clause 1 or clause 2, wherein the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent.

Clause 4. The polyurethane foam-forming composition of one of clause 1 to clause 3, wherein the isopropylidenediphenol-based polyether polyol has a functionality of at least 1.5, such as 1.5 to 3, 1.5 to 2.5, 1.5 to 2.0 or 1.5 to 1.7; a viscosity at 25° C. (as determined by ASTM-D4878-15) of no more than 5000 mPa·s, such as 1000 to 5000 mPa·s, 3000 to 5000 mPa·s, 1000 to 4900 mPa·s or 3000 to 4900 mPa·s, and/or a measured hydroxyl number (as determined by ASTM D4274-16) of 100 to 400 mg KOH/g, 100 to 400 mg KOH/g, 200 to 400 mg KOH/g, 200 to 300 mg KOH/g, or 220 to 260 mg KOH/g.

Clause 5. The polyurethane foam-forming composition of one of clause 1 to clause 4, wherein the isopropylidenediphenol-based polyether polyol comprises: (i) at least 10% by weight, such as 10 to 60% by weight, of an alkoxylate of 4,4'-isopropylidenediphenol; (ii) at least 5% by weight, such as 10 to 40% by weight of an alkoxylate of 2,4'- and/or 2,2'-isomers of the bisphenol base body; and (iii) at least 10% by weight, such as 10 to 60% by weight, of an alkoxylate of a compound with a chromane and/or indane base body, wherein each such weight percent is based on the total weight of the isopropylidenediphenol-based polyether polyol.

Clause 6. The polyurethane foam-forming composition of clause 5, wherein the compound with a chromane and/or indane base body comprises 4-(2,2,4-trimethyl-3.4-dihydro-2H-chromen-4-yl)phenol, 4-(2,4,4-trimethyl-3-4-dihydro-2H-chromen-2-yl)phenol, 3-(4-hydroxyphenyl)-1,1,3-trimethyl-2H-inden-5-ol, 1-(4-hydroxyphenyl)-1,3,3-trimethyl-2H-inden-5-ol, or a mixture of any two or more thereof.

Clause 7. The polyurethane foam-forming composition of one of clause 1 to clause 5, wherein the isopropylidenediphenol-based polyether polyol further comprises an alkoxylate of a diol that has a molecular weight less than the molecular weight of isopropylidenediphenol and that does not contain structural elements derived from phenol, acetone and/or isopropylidenediphenol, such as an alkoxylate of propylene glycol, dipropylene glycol, diethylene glycol, 1,2-diphenyl-ethane-1,2-diol, triethylene glycol, butylene glycol, cyclohexanediol, cyclohexane-1,4-dimethanol, pentanediol, hexanediol, neopentyl glycol, or a mixture of any two or more thereof.

Clause 8. The polyurethane foam-forming composition of clause 7, wherein the diol has a molar mass of less than 150 g/mol, less than 100 g/mol, or less than 80 g/mol.

Clause 9. The polyurethane foam-forming composition of clause 7 or clause 8, wherein the alkoxylate of a diol that has a molecular weight less than the molecular weight of isopropylidenediphenol and that does not contain structural elements derived from phenol, acetone and/or isopropylidenediphenol is present in an amount of 0.1 to 20% by weight, 0.1 to 10% by weight, 1 to 5% by weight, or 1 to 3% by weight, based on the total weight of the isopropylidenediphenol-based polyether polyol.

Clause 10. The polyurethane foam-forming composition of one of clause 1 to clause 9, wherein the isopropylidenediphenol-based polyether polyol comprises an internal block comprising polymerized ethylene oxide moieties and an external cap comprising polymerized propylene oxide moieties.

Clause 11. The polyurethane foam-forming composition of clause 10, wherein ethylene oxide moieties are present in an amount of least 50% by weight, at least 80% by weight, at least 90%, at least 95% by weight, or 100% by weight, based on the total weight of the polymerized alkylene oxide moieties of the internal block of the isopropylidenediphenol-based polyether polyol.

Clause 12. The polyurethane foam-forming composition of one of clause 1 to clause 11, wherein propylene oxide moieties are present in an amount of least 50% by weight, at least 80% by weight, at least 90%, at least 95% by weight, or 100% by weight, based on the total weight of the polymerized alkylene oxide moieties of the external cap of the isopropylidenediphenol-based polyether polyol.

Clause 13. The polyurethane foam-forming composition of one of clause 1 to clause 12, wherein ethylene oxide is used in an amount of at least 50% by weight or at least 60% by weight, based on the total amount of alkylene oxide used to prepare the isopropylidenediphenol-based polyether polyol.

Clause 14. The polyurethane foam-forming composition of clause 13, wherein propylene oxide is used in an amount of up to 50% by weight or up to 40% by weight, based on the total weight of alkylene oxide used to prepare the isopropylidenediphenol-based polyether polyol.

Clause 15. The polyurethane foam-forming composition of one of clause 10 to clause 14, wherein polymerized propylene oxide moieties of the external cap are present in an amount of at least 20% by weight, such as 20 to 50% by weight, 20 to 40% by weight, 30 to 40% by weight, or 35 to 40% by weight, based on the total weight of polymerized alkylene oxide moieties in the isopropylidenediphenol-based polyether polyol.

Clause 16. The polyurethane foam-forming composition of one of clause 1 to clause 15, wherein a BPA resin comprising (i) 4'-isopropylidenediphenol; (ii) 2,4'- and/or 2,2'-isopropylidenediphenol, and (iii) components comprising structural elements which are derived from phenol, acetone and/or isopropylidenediphenol, but which are not isomers of isopropylidenediphenol, is present in an amount of 80 to 99.9% by weight, 90 to 99.9% by weight, 95 to 99% by weight, or 97 to 99% by weight, based on the total weight of H-functional starter composition employed to prepare the isopropylidenediphenol-based polyether polyol and/or is present in an amount of 30 to 60% by weight, 40 to 50% by weight, or, in some cases, 43 to 48% by weight, based on the total weight of the isopropylidenediphenol-based polyether polyol.

Clause 17. The polyurethane foam-forming composition of one of clause 1 to clause 16, wherein the isopropylidenediphenol-based polyether polyol is present in an amount of at least 1% by weight, at least 5% by weight or at least 10% by weight and/or no more than 40% by weight, no more than 35% by weight, or no more than 30% by weight, based on the total weight of polyol.

Clause 18. The polyurethane foam-forming composition of one of clause 1 to clause 17, wherein the polyol blend further comprises an amine-initiated polyether polyol, such as an aromatic amine-initiated polyether polyol.

Clause 19. The polyurethane foam-forming composition of clause 18, wherein the amine-initiated polyether polyol comprises an aromatic amine-initiated polyether polyol comprising toluenediamine ("TDA"), such as 2,3-TDA, 3,4-TDA, 2,4-TDA, 2,6-TDA or a mixture thereof, aniline, 4,4'-methylene dianiline, a methylene-bridged polyphenyl polyamine composed of isomers of methylene dianilines and triamines or polyamines of higher molecular weight prepared by reacting aniline with formaldehyde, or a mixture of any two or more thereof.

Clause 20. The polyurethane foam-forming composition of clause 18 or clause 19, wherein the amine-initiated polyether polyol further comprises an initiator comprising water, propylene glycol, glycerin, ethylene glycol, an ethanol amine, diethylene glycol, or a mixture of any two or more thereof.

Clause 21. The polyurethane foam-forming composition of one of clause 18 to clause 20, wherein aromatic amine is present in an amount of more than 50% by weight, at least 80% by weight, at least 90% by weight, or 100% by weight, based on the total weight of H-functional starter used to produce the aromatic amine-initiated polyether polyol.

Clause 22. The polyurethane foam-forming composition of one of clause 18 to clause 21, wherein the amine-initiated polyether polyol is prepared from an alkylene oxide comprising propylene oxide, such as where propylene oxide is used in an amount of more than 50% by weight, at least 80% by weight, at least 90% by weight, or 100% by weight, based on the total weight of alkylene oxide used to prepare the amine-initiated polyether polyol.

Clause 23. The polyurethane foam-forming composition of one of clause 18 to clause 22, wherein the amine-initiated polyether polyol has a hydroxyl number of 200 to 600 mg KOH/g, 300 to 500 mg KOH/g, 350 to 450 mg KOH/g, or, 380 to 420 mg KOH/g and/or a functionality of 2.5 to 6, 3 to 5, 3.5 to 4.5, 3.8 to 4.2 or 4.0.

Clause 24. The polyurethane foam-forming composition of one of clause 18 to clause 23, wherein the amine-initiated polyether polyol is present in an amount of at least 20% by weight, at least 30% by weight, or at least 40% by weight and/or no more than 99% by weight, no more than 80% by weight, no more than 70% by weight no more than 60% by weight, or no more than 50% by weight, based on the total weight of polyol.

Clause 25. The polyurethane foam-forming composition of one of clause 1 to clause 24, wherein the polyol blend further comprises a saccharide-initiated polyether polyol, such as where the saccharide comprises sucrose, sorbitol, or maltitol.

Clause 26. The polyurethane foam-forming composition of clause 25, wherein the saccharide-initiated polyether polyol is co-initiated with water, propylene glycol, glycerin, ethylene glycol, an ethanol amine, diethylene glycol, or a mixture of any two or more thereof.

Clause 27. The polyurethane foam-forming composition of clause 25 or clause 26, wherein saccharide is present in an amount of more than 50% by weight, such as at least 70% by weight or at least 80% by weight, based on the total weight of H-functional starter used to produce the saccharide-initiated polyether polyol.

Clause 28. The polyurethane foam-forming composition of one of clause 25 to clause 27, wherein propylene oxide is used in an amount of more than 50% by weight, at least 60% by weight, or at least 70% by weight, based on the total weight of alkylene oxide used to prepare the saccharide-initiated polyether polyol.

Clause 29. The polyurethane foam-forming composition of one of clause 25 to clause 28, wherein the saccharide-initiated polyether polyol has a hydroxyl number of 200 to 600 mg KOH/g, 300 to 550 mg KOH/g, 300 to 500 mg KOH/g, or 350 to 500 mg KOH/g, and a functionality of 4 to 6, 5 to 6, or 5.5 to 6.0.

Clause 30. The polyurethane foam-forming composition of one of clause 25 to clause 29, wherein the saccharide-initiated polyether polyol is present in an amount of at least 20% by weight, at least 25% by weight, or at least 30% by weight and/or no more than 80% by weight, no more than 70% by weight, no more than 60% by weight, no more than 50% by weight, or no more than 40% by weight, based on the total weight of polyol.

Clause 31. The polyurethane foam-forming composition of one of clause 1 to clause 30, wherein the polyol blend further comprises polyester polyol, such as an aromatic polyester polyol, such as an aromatic polyester polyol that has a hydroxyl number of 150 to 410 mg KOH/g, 150 to 360 mg KOH/g, 200 to 335 mg KOH/g, or 200 to 250 mg KOH/g, and a functionality of 1.5 to 3 or 1.9 to 2.5.

Clause 32. The polyurethane foam-forming composition of clause 31, wherein aromatic polyester polyol is present in an amount of 1 to 25%, 5 to 25% by weight, 5 to 20% by weight, or 10 to 20% by weight, based on the total weight of polyol.

Clause 33. The polyurethane foam-forming composition of one of clause 1 to clause 30, wherein the polyol blend is substantially free or completely free of aromatic polyester polyol or other polyester polyols.

Clause 34. The polyurethane foam-forming composition of one of clause 18 to clause 33, wherein the aromatic amine-initiated polyether polyol (a) and the isopropylidenediphenol-based polyether polyol (b) are present in the polyol blend in a weight ratio (a):(b) of at least 1:1, 1:1 to 1000:1, 1:1 to 500:1, 1:1 to 100:1, 1:1 to 50:1, 1:1 to 10:1, 1:1 to 5:1, 1:1 to 4:1 or 1.5 to 3.5:1.

Clause 35. The polyurethane foam-forming composition of one of clause 25 to clause 34, wherein the aromatic amine-initiated polyether polyol (a) and the saccharide-initiated polyether polyol (c) are present in a weight ratio (a):(c) of 1:2 to 2:1, 0.7:1 to 1:0.7 or 0.9:1 to 1:0.9.

Clause 36. The polyurethane foam-forming composition of one of clause 25 to clause 35, wherein the saccharide-initiated polyether polyol (c) and isopropylidenediphenol-based polyether polyol (b) are present in a weight ratio (c):(b) of 1:1 to 1000:1, 1:1 to 500:1, 1:1 to 100:1, 1:1 to 50:1, 1:1 to 10:1, 2:1 to 5:1, or 1.1:1 to 2:1.

Clause 37. The polyurethane foam-forming composition of one of clause 1 to clause 36, wherein the polyol blend has a weighted average functionality of from 3 to 5, 3 to 4.5 or 3.5 to 4.0, and/or a weighted average hydroxyl number of 300 to 500 mg KOH/g, 300 to 450 mg KOH/g, 300 to 400 mg KOH/g or 340 to 400 mg KOH/g.

Clause 38. The polyurethane foam-forming composition of one of clause 25 to clause 37, wherein the sum of the amount of the isopropylidenediphenol-based polyether polyol, the aromatic amine-initiated polyether polyol, and the saccharide-initiated polyether polyol, is at least 90% by weight, at least 95% by weight, at least 98% by weight, or 100% by weight, based on the total weight of polyol.

Clause 39. The polyurethane foam-forming composition of one of clause 1 to clause 38, with the proviso that the polyol blend does not include any filled polyol.

Clause 40. The polyurethane foam-forming composition of one of clause 1 to clause 39, wherein the blowing agent comprises a physical blowing agent.

Clause 41. The polyurethane foam-forming composition of clause 40, wherein the physical blowing agent comprises a halogenated blowing agent, such as a chlorofluorocarbon, a hydrofluorocarbon, a hydrochlorofluorocarbon, a halogenated olefin, such as a hydrofluoroolefin, such as a hydrochlorofluoroolefin, such as 1-chloro-3,3,3-trifluoropropene, 2-chloro-3,3,3-trifluoropropene, 1,2-dichloro-1,2-difluoroethene, 3,3-dichloro-3-fluoropropene, 2-chloro-1,1,1,4,4,4-hexafluorobutene-2,2-chloro-1,1,1,3,4,4,4-heptafluorobutene-2, or a mixture of any two or more thereof, such as a combination of cis-1,1,1,4,4,4-hexafluoro-2-butene and trans-1,1,1,4,4,4-hexafluoro-2-butene.

Clause 42. The polyurethane foam-forming composition of clause 41, wherein hydrochlorofluoroolefin is present in amount of at least 80% by weight, at least 90% by weight, at least 95% by weight, at least 99% by weight, or 100% by weight, based on the total weight of the physical blowing agent.

Clause 43. The polyurethane foam-forming composition of clause 40, wherein the physical blowing agent comprises a hydrocarbon, such as cyclopentane.

Clause 44. The polyurethane foam-forming composition of clause 43, wherein the hydrocarbon, such as cyclopentane, is present in an amount of more than 50% by weight, at least 60% by weight, at least 70% by weight, at least 80% by weight, at least 90% by weight, or 100% by weight, based on the total weight of physical blowing agent.

Clause 45. The polyurethane foam-forming composition of one of clause 40 to clause 44, wherein the physical blowing agent is present in an amount of at least 10% by weight, such as 10 to 30% by weight, 15 to 30% by weight, or 15 to 25% by weight, based on the total weight of the polyurethane foam-forming composition except for the weight of the polyisocyanate.

Clause 46. The polyurethane foam-forming composition of one of clause 40 to clause 45, wherein the blowing agent further comprises water, such as where water is present in an amount of at least 0.5 to 5% by weight, 1.0 to 5.0% by weight, 1.0 to 4.0% by weight, 1.0 to 3.0% by weight, or 1.0 to 2.0% by weight, based on the total weight of the polyurethane foam-forming composition except for the weight of the polyisocyanate.

Clause 47. The polyurethane foam-forming composition of clause 46, wherein the physical blowing agent composition and the water are present in a relative ratio, by weight, of at least 5:1, 5:1 to 50:1, 5:1 to 20:1 or 10:1 to 20:1.

Clause 48. The polyurethane foam-forming composition of one of clause 1 to clause 47, wherein the isocyanate index is 1.0 to 1.5, 1.1 to 1.5, or 1.2 to 1.4.

Clause 49. A polyurethane foam formed from the polyurethane foam-forming composition of one of clause 1 to clause 48, wherein the polyurethane foam has a closed-cell content of more than 80%, more than 85%, or more than 88%, as measured according to ASTM D6226-15.

Clause 50. A composite article comprising the polyurethane foam of clause 49 sandwiched between one or more facer substrates, such as where the facer substrate comprises plastic, such as polypropylene resin reinforced with continuous bi-directional glass fibers or a fiberglass reinforced polyester copolymer, paper, wood, or metal.

Clause 51. A refrigeration apparatus comprising the composite article of clause 50.

Clause 52. A polyol blend comprising: (a) an amine-initiated polyether polyol; and (b) an isopropylidenediphenol-based polyether polyol comprising: (1) an alkoxylate of 4,4'-isopropylidenediphenol; (2) an alkoxylate of 2,4'-isopropylidenediphenol, 2,2'-isopropylidenediphenol, or a mixture thereof, and (3) an alkoxylate of components comprising structural elements which are derived from phenol, acetone, isopropylidenediphenol, or a mixture of any two or more thereof, but which are not isomers of isopropylidenediphenol, wherein (a) and (b) are present in the polyol blend in a weight ratio (a):(b) of at least 1:1.

Clause 53. The polyol blend of clause 52, wherein the isopropylidenediphenol-based polyether polyol has a functionality of at least 1.5, such as 1.5 to 3, 1.5 to 2.0 or 1.5 to 1.7; a viscosity at 25° C. (as determined by ASTM-D4878-15) of no more than 5000 mPa·s, such as 1000 to 5000 mPa·s, 3000 to 5000 mPa·s, 1000 to 4900 mPa·s or 3000 to 4900 mPa·s, and/or a measured hydroxyl number (as determined by ASTM D4274-16) of 100 to 400 mg KOH/g, 100 to 400 mg KOH/g, 200 to 400 mg KOH/g, 200 to 300 mg KOH/g, or 220 to 260 mg KOH/g.

Clause 54. The polyol blend of clause 52 or clause 53, wherein the isopropylidenediphenol-based polyether polyol comprises: (i) at least 10% by weight, such as 10 to 60% by weight, of an alkoxylate of 4,4'-isopropylidenediphenol; (ii) at least 5% by weight, such as 10 to 40% by weight of an alkoxylate of 2,4'- and/or 2,2'-isomers of the bisphenol base body; and (iii) at least 10% by weight, such as 10 to 60% by weight, of an alkoxylate of a compound with a chromane and/or indane base body, wherein each such weight percent is based on the total weight of the isopropylidenediphenol-based polyether polyol.

Clause 55. The polyol blend of clause 54, wherein the compound with a chromane and/or indane base body comprises 4-(2,2,4-trimethyl-3.4-dihydro-2H-chromen-4-yl) phenol, 4-(2,4,4-trimethyl-3-4-dihydro-2H-chromen-2-yl) phenol, 3-(4-hydroxyphenyl)-1,1,3-trimethyl-2H-inden-5-ol, 1-(4-hydroxyphenyl)-1,3,3-trimethyl-2H-inden-5-ol, or a mixture of any two or more thereof.

Clause 56. The polyol blend of one of clause 52 to clause 55, wherein the isopropylidenediphenol-based polyether polyol further comprises an alkoxylate of a diol that has a molecular weight less than the molecular weight of isopropylidenediphenol and that does not contain structural elements derived from phenol, acetone and/or isopropylidenediphenol, such as an alkoxylate of propylene glycol, dipropylene glycol, diethylene glycol, 1,2-diphenyl-ethane-1,2-diol, triethylene glycol, butylene glycol, cyclohexanediol, cyclohexane-1,4-dimethanol, pentanediol, hexanediol, neopentyl glycol, or a mixture of any two or more thereof.

Clause 57. The polyol blend of clause 56, wherein the diol has a molar mass of less than 150 g/mol, less than 100 g/mol, or less than 80 g/mol.

Clause 58. The polyol blend of clause 56 or clause 57, wherein the alkoxylate of a diol that has a molecular weight less than the molecular weight of isopropylidenediphenol and that does not contain structural elements derived from phenol, acetone and/or isopropylidenediphenol is present in an amount of 0.1 to 20% by weight, 0.1 to 10% by weight, 1 to 5% by weight, or 1 to 3% by weight, based on the total weight of the isopropylidenediphenol-based polyether polyol.

Clause 59. The polyol blend of one of clause 52 to clause 58, wherein the isopropylidenediphenol-based polyether polyol comprises an internal block comprising polymerized ethylene oxide moieties and an external cap comprising polymerized propylene oxide moieties.

Clause 60. The polyol blend of clause 59, wherein ethylene oxide moieties are present in an amount of least 50% by weight, at least 80% by weight, at least 90%, at least 95% by weight, or 100% by weight, based on the total weight of the polymerized alkylene oxide moieties of the internal block of the isopropylidenediphenol-based polyether polyol.

Clause 61. The polyol blend of one of clause 52 to clause 60, wherein propylene oxide moieties are present in an amount of least 50% by weight, at least 80% by weight, at least 90%, at least 95% by weight, or 100% by weight, based on the total weight of the polymerized alkylene oxide moieties of the external cap of the isopropylidenediphenol-based polyether polyol.

Clause 62. The polyol blend of one of clause 52 to clause 61, wherein ethylene oxide is used in an amount of at least 50% by weight or at least 60% by weight, based on the total amount of alkylene oxide used to prepare the isopropylidenediphenol-based polyether polyol.

Clause 63. The polyol blend of clause 62, wherein propylene oxide is used in an amount of up to 50% by weight or up to 40% by weight, based on the total weight of alkylene oxide used to prepare the isopropylidenediphenol-based polyether polyol.

Clause 64. The polyol blend of one of clause 59 to clause 63, wherein polymerized propylene oxide moieties of the external cap are present in an amount of at least 20% by weight, such as 20 to 50% by weight, 20 to 40% by weight, 30 to 40% by weight, or 35 to 40% by weight, based on the total weight of polymerized alkylene oxide moieties in the isopropylidenediphenol-based polyether polyol.

Clause 65. The polyol blend of one of clause 52 to clause 64, wherein a BPA resin comprising (i) 4'-isopropylidenediphenol; (ii) 2,4'- and/or 2,2'-isopropylidenediphenol, and (iii) components comprising structural elements which are derived from phenol, acetone and/or isopropylidenediphenol, but which are not isomers of isopropylidenediphenol, is present in an amount of 80 to 99.9% by weight, 90 to 99.9% by weight, 95 to 99% by weight, or 97 to 99% by weight, based on the total weight of H-functional starter composition employed to prepare the isopropylidenediphenol-based polyether polyol and/or is present in an amount of 30 to 60% by weight, 40 to 50% by weight, or, in some cases, 43 to 48% by weight, based on the total weight of the isopropylidenediphenol-based polyether polyol Clause 66. The polyol blend of one of clause 52 to clause 65, wherein the isopropylidenediphenol-based polyether polyol is present in an amount of at least 1% by weight, at least 5% by weight or at least 10% by weight and/or no more than 40% by weight, no more than 35% by weight, or no more than 30% by weight, based on the total weight of polyol.

Clause 67. The polyol blend of one of clause 52 to clause 66, wherein the amine-initiated polyether polyol comprises an aromatic amine-initiated polyether polyol.

Clause 68. The polyol blend of clause 67, wherein the aromatic amine-initiated polyether polyol comprises toluenediamine ("TDA"), such as 2,3-TDA, 3,4-TDA, 2,4-TDA, 2,6-TDA or a mixture thereof, aniline, 4,4'-methylene dianiline, a methylene-bridged polyphenyl polyamine composed of isomers of methylene dianilines and triamines or polyamines of higher molecular weight prepared by reacting aniline with formaldehyde, or a mixture of any two or more thereof.

Clause 69. The polyol blend of clause 67 or clause 68, wherein the aromatic amine-initiated polyether polyol further comprises an initiator comprising water, propylene glycol, glycerin, ethylene glycol, an ethanol amine, diethylene glycol, or a mixture of any two or more thereof.

Clause 70. The polyol blend of one of clause 67 to clause 69, wherein aromatic amine is present in an amount of more than 50% by weight, at least 80% by weight, at least 90% by weight, or 100% by weight, based on the total weight of H-functional starter used to produce the aromatic amine-initiated polyether polyol.

Clause 71. The polyol blend of one of clause 52 to clause 70, wherein the amine-initiated polyether polyol is prepared from an alkylene oxide comprising propylene oxide, such as where propylene oxide is used in an amount of more than 50% by weight, at least 80% by weight, at least 90% by weight, or 100% by weight, based on the total weight of alkylene oxide used to prepare the amine-initiated polyether polyol.

Clause 72. The polyol blend of one of clause 52 to clause 71, wherein the amine-initiated polyether polyol has a hydroxyl number of 200 to 600 mg KOH/g, 300 to 500 mg KOH/g, 350 to 450 mg KOH/g, or, 380 to 420 mg KOH/g and/or a functionality of 2.5 to 6, 3 to 5, 3.5 to 4.5, 3.8 to 4.2 or 4.0.

Clause 73. The polyol blend of one of clause 52 to clause 72, wherein the amine-initiated polyether polyol is present in an amount of at least 20% by weight, at least 30% by weight, or at least 40% by weight and/or no more than 99% by weight, no more than 80% by weight, no more than 70% by weight no more than 60% by weight, or no more than 50% by weight, based on the total weight of polyol.

Clause 74. The polyol blend of one of clause 52 to clause 73, wherein the polyol blend further comprises a saccharide-initiated polyether polyol, such as where the saccharide comprises sucrose, sorbitol, or maltitol.

Clause 75. The polyol blend of clause 74, wherein the saccharide-initiated polyether polyol is co-initiated with water, propylene glycol, glycerin, ethylene glycol, an ethanol amine, diethylene glycol, or a mixture of any two or more thereof.

Clause 76. The polyol blend of clause 74 or clause 75, wherein saccharide is present in an amount of more than 50% by weight, such as at least 70% by weight or at least 80% by weight, based on the total weight of H-functional starter used to produce the saccharide-initiated polyether polyol.

Clause 77. The polyol blend of one of clause 74 to clause 76, wherein propylene oxide is used in an amount of more than 50% by weight, at least 60% by weight, or at least 70% by weight, based on the total weight of alkylene oxide used to prepare the saccharide-initiated polyether polyol.

Clause 78. The polyol blend of one of clause 74 to clause 77, wherein the saccharide-initiated polyether polyol has a hydroxyl number of 200 to 600 mg KOH/g, 300 to 550 mg KOH/g, 300 to 500 mg KOH/g, or 350 to 500 mg KOH/g, and a functionality of 4 to 6, 5 to 6, or 5.5 to 6.0.

Clause 79. The polyol blend of one of clause 74 to clause 78, wherein the saccharide-initiated polyether polyol is present in an amount of at least 20% by weight, at least 25% by weight, or at least 30% by weight and/or no more than 80% by weight, no more than 70% by weight, no more than 60% by weight, no more than 50% by weight, or no more than 40% by weight, based on the total weight of polyol.

Clause 80. The polyol blend of one of clause 52 to clause 79, wherein the polyol blend further comprises polyester polyol, such as an aromatic polyester polyol, such as an aromatic polyester polyol that has a hydroxyl number of 150 to 410 mg KOH/g, 150 to 360 mg KOH/g, 200 to 335 mg KOH/g, or 200 to 250 mg KOH/g, and a functionality of 1.5 to 3 or 1.9 to 2.5.

Clause 81. The polyol blend of clause 80, wherein aromatic polyester polyol is present in an amount of 1 to 25%, 5 to 25% by weight, 5 to 20% by weight, or 10 to 20% by weight, based on the total weight of polyol.

Clause 82. The polyol blend of one of clause 52 to clause 81, wherein the polyol blend is substantially free or completely free of aromatic polyester polyol or other polyester polyols.

Clause 83. The polyol blend of one of clause 67 to clause 82, wherein the aromatic amine-initiated polyether polyol (a) and the isopropylidenediphenol-based polyether polyol (b) are present in the polyol blend in a weight ratio (a):(b) of at least 1:1, 1:1 to 1000:1, 1:1 to 500:1, 1:1 to 100:1, 1:1 to 50:1, 1:1 to 10:1, 1:1 to 5:1, 1:1 to 4:1 or 1.5 to 3.5:1.

Clause 84. The polyol blend of one of clause 67 to clause 83, wherein the aromatic amine-initiated polyether polyol (a) and the saccharide-initiated polyether polyol (c) are present in a weight ratio (a):(c) of 1:2 to 2:1, 0.7:1 to 1:0.7 or 0.9:1 to 1:0.9.

Clause 85. The polyol blend of one of clause 74 to clause 84, wherein the saccharide-initiated polyether polyol (c) and isopropylidenediphenol-based polyether polyol (b) are present in a weight ratio (c):(b) of 1:1 to 1000:1, 1:1 to 500:1, 1:1 to 100:1, 1:1 to 50:1, 1:1 to 10:1, 2:1 to 5:1, or 1.1:1 to 2:1.

Clause 86. The polyol blend of one of clause 52 to clause 85, wherein the polyol blend has a weighted average functionality of from 3 to 5, 3 to 4.5 or 3.5 to 4.0, and/or a weighted average hydroxyl number of 300 to 500 mg KOH/g, 300 to 450 mg KOH/g, 300 to 400 mg KOH/g or 340 to 400 mg KOH/g.

Clause 87. The polyol blend of one of clause 74 to clause 86, wherein the sum of the amount of the isopropylidenediphenol-based polyether polyol, the aromatic amine-initiated polyether polyol, and the saccharide-initiated polyether polyol, is at least 90% by weight, at least 95% by weight, at least 98% by weight, or 100% by weight, based on the total weight of polyol.

Clause 88. The polyol blend of one of clause 52 to clause 87, with the proviso that the polyol blend does not include any filled polyol.

Clause 89. An isocyanate-reactive composition comprising the polyol blend of one of clause 52 to clause 88 and a blowing agent.

Clause 90. The isocyanate-reactive composition of clause 89, wherein the blowing agent comprises a physical blowing agent.

Clause 91. The isocyanate-reactive composition of clause 90, wherein the physical blowing agent comprises a halogenated blowing agent, such as a chlorofluorocarbon, a hydrofluorocarbon, a hydrochlorofluorocarbon, a halogenated olefin, such as a hydrofluoroolefin, such as a hydrochlorofluoroolefin, such as 1-chloro-3,3,3-trifluoropropene, 2-chloro-3,3,3-trifluoropropene, 1,2-dichloro-1,2-difluoroethene, 3,3-dichloro-3-fluoropropene, 2-chloro-1,1,1,4,4,4-hexafluorobutene-2,2-chloro-1,1,1,3,4,4,4-heptafluorobutene-2, or a mixture of any two or more thereof, such as a combination of cis-1,1,1,4,4,4-hexafluoro-2-butene and trans-1,1,1,4,4,4-hexafluoro-2-butene.

Clause 92. The isocyanate-reactive composition of clause 91, wherein hydrochlorofluoroolefin is present in amount of at least 80% by weight, at least 90% by weight, at least 95% by weight, at least 99% by weight, or 100% by weight, based on the total weight of the physical blowing agent.

Clause 93. The isocyanate-reactive composition of clause 90, wherein the physical blowing agent comprises a hydrocarbon, such as cyclopentane.

Clause 94. The isocyanate-reactive composition of clause 93, wherein the hydrocarbon, such as cyclopentane, is present in an amount of more than 50% by weight, at least 60% by weight, at least 70% by weight, at least 80% by weight, at least 90% by weight, or 100% by weight, based on the total weight of physical blowing agent.

Clause 95. The isocyanate-reactive composition of one of clause 90 to clause 94, wherein the physical blowing agent is present in an amount of at least 10% by weight, such as 10 to 30% by weight, 15 to 30% by weight, or 15 to 25% by weight, based on the total weight of the isocyanate-reactive composition.

Clause 96. The isocyanate-reactive composition of one of clause 90 to clause 95, wherein the blowing agent further comprises water, such as where water is present in an amount of at least 0.5 to 5% by weight, 1.0 to 5.0% by weight, 1.0 to 4.0% by weight, 1.0 to 3.0% by weight, or 1.0 to 2.0% by weight, based on the total weight of the isocyanate-reactive composition.

Clause 97. The isocyanate-reactive composition of clause 96, wherein the physical blowing agent composition and the water are present in a relative ratio, by weight, of at least 5:1, 5:1 to 50:1, 5:1 to 20:1 or 10:1 to 20:1.

Clause 98. A polyurethane foam-forming composition comprising the isocyanate-reactive composition of one of clause 90 to clause 97 and a polyisocyanate, such as where the polyisocyanate comprises m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, 3,3'-dimethyl-diphenyl-propane-4,4'-diisocyanate, 2,4,6-toluene triisocyanate, 4,4'-dimethyl-diphenyl-methane-2,2',5,5'-tetraisocyanate, a polymethylene polyphenyl-polyisocyanate, or a mixture of any two or more thereof.

Clause 99. The polyurethane foam-forming composition of clause 98, wherein the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent.

Clause 100. The polyurethane foam-forming composition of clause 98 or clause 99, wherein the polyisocyanate is present in an amount sufficient to provide an isocyanate index of 0.7 to 1.5, 1.0 to 1.5, 1.1 to 1.5, or 1.2 to 1.4.

Clause 101. A polyurethane foam formed from the polyurethane foam-forming composition of one of clause 98 to clause 100, wherein the polyurethane foam has a closed-cell content of more than 80%, more than 85%, or more than 88%, as measured according to ASTM D6226-15.

Clause 102. A composite article comprising the polyurethane foam of clause 101 sandwiched between one or more facer substrates, such as where the facer substrate comprises plastic, such as polypropylene resin reinforced with continuous bi-directional glass fibers or a fiberglass reinforced polyester copolymer, paper, wood, or metal.

Clause 103. A refrigeration apparatus comprising the composite article of clause 102.

The non-limiting and non-exhaustive examples that follow are intended to further describe various non-limiting and non-exhaustive implementations without restricting the scope of the implementations described in this specification.

EXAMPLES

Examples 1-14

Foam-forming compositions were prepared using the ingredients and amounts (in parts by weight) set forth in Table 1. The following materials were used:

POLYOL 1: a polyether polyol having a hydroxyl number of 388 mg KOH/g and a functionality of 4, prepared by alkoxylating o-TDA, in which the alkylene oxide was 37% by weight ethylene oxide and 63% by weight propylene oxide;

POLYOL 2: a polyether polyol having a hydroxyl number of 470 mg KOH/g and a functionality of 4.7, prepared by alkoxylating a mixture of sucrose and glycerine (57% by weight sucrose and 43% by weight glycerine), in which the alkylene oxide was 100% propylene oxide;

POLYOL 3: a polyether polyol having a hydroxyl number of 360 mg KOH/g and a functionality of 3.6, prepared by alkoxylating o-TDA, in which the alkylene oxide was 100% by weight propylene oxide;

POLYOL 4: a polyether polyol having a hydroxyl number of 400 mg KOH/g and a functionality of 4.0, prepared by alkoxylating o-TDA, in which the alkylene oxide was 100% by weight propylene oxide;

POLYOL 5: a polyether polyol having a hydroxyl number of 380 mg KOH/g and a functionality of 5.8, prepared by alkoxylating a mixture of sucrose and water (83.3% by weight sucrose and 16.7% by weight water), in which the alkylene oxide was 100% propylene oxide;

POLYOL 6: a polyether polyol having a hydroxyl number of 470 mg KOH/g and a functionality of 5.2, prepared by alkoxylating a mixture of sucrose, propylene glycol and water (82.4% by weight sucrose, 14.5% by weight propylene glycol and 3.1% by weight water), in which the alkylene oxide was 100% propylene oxide;

POLYOL 7: a polyether polyol having a hydroxyl number of 470 mg KOH/g and a functionality of 5.52, prepared by alkoxylating a mixture of sucrose and water (85% by weight sucrose and 15% by weight water), in which the alkylene oxide was 85% by weight ethylene oxide and 15% by weight propylene oxide;

POLYOL 8: a polyether polyol having a hydroxyl number of 470 mg KOH/g and a functionality of 3.0, prepared by propoxylating glycerin;

POLYOL 9: an aromatic polyester polyol having a hydroxyl number of 240 mg KOH/g and a functionality of 2, commercially available as STEPANPOL® PS-2502A from Stepan Company;

POLYOL 10: an aromatic polyester polyol having a hydroxyl number of 315 mg KOH/g and a functionality of 2.4, commercially available as STEPANPOL® PS-3024 from Stepan Company;

POLYOL 11: a blend of polyether polyols having an average hydroxyl number of 238 mg KOH/g and an arithmetically calculated functionality of about 1.6, the polyols prepared by alkoxylating a mixture of propylene glycol and BPA resin according to the method described in U.S. patent application Ser. No. 17/670,727, in which the alkylene oxide was 67% by weight ethylene oxide and 33% by weight propylene oxide;
SURFACTANT 1: Dabco® DC5357 from Evonik;
SURFACTANT 2: Tegostab® B-8465 from Evonik;
SURFACTANT 3: Dabco® SI-3201 from Evonik;
CATALYST 1: N,N,N',N",N"-pentamethyldiethylenetriamine, Polycat™ 5 from Evonik;
CATALYST 2: a solution of potassium-octoate in diethylene glycol, Dabco® K-15 from Evonik;
CATALYST 3: N,N',N"-Dimethylaminopropylhexahydrotriazine, Polycat™ 41 from Evonik;
BLOWING AGENT 1: cyclopentane;
BLOWING AGENT 2: trans-1,1,1-trifluoro-3-chloropropene, Solstice® LBA from Honeywell International Inc.;
BLOWING AGENT 3: a combination of 70% by weight cis-1,1,1,4,4,4-hexafluoro-2-butene (Opteon™ 1100 from Chemours) and 30% by weight trans-1,1,1,4,4,4-hexafluoro-2-butene (Opteon™ 1150 from Chemours);
ISO 1: polymeric diphenylmethane diisocyanate (pMDI); NCO weight 31.5%; viscosity 200 mPa·s @ 25° C. (MONDUR® MR from Covestro); and
ISO 2: pMDI; NCO weight 31.3%; viscosity 400 mPa·s @ 25° C. (MONDUR® 44V40 from Covestro).

In each case, a master batch was prepared by mixing the polyols, catalysts, surfactant, water and blowing agents in the amounts indicated in Table 1. Foams were prepared by mixing the masterbatch with the ISO in an amount sufficient to provide the isocyanate index listed in Table 1 and pouring the mixture into an 83 ounce paper cup. The cream time, gel time, tack-free time and free rise density ("FRD") were recorded.

Foam panels were also prepared by hand using an air-powered mixer (3000 rpm) and utilizing a temperature controlled mold (120° F.; dimensions of 25"×13"×2"). The polyol premix and isocyanate temperatures were maintained at 25° C. and all samples were demolded after 3 minutes. Minimum fill was determined by slightly overfilling the mold cavity and then removing the excess foam such that the foam weight contained in the 25"×13"×2" volume could be measured. After determining the minimum fill value, foam panels were prepared to obtain a desired density approximately 8-12% over the minimum fill density. Results are in Table 1.

A 8.8"×8.8"×4.0" mold at a temperature of 40° C. was also utilized to determine swell values. Lab swell was determined by mixing the masterbatch with the ISO in an amount sufficient to provide the isocyanate index listed in Table 1 and achieve an overpack value of 25% and pouring the mixture into the mold. The minimum fill density, and consequent amount of foam required to achieve 25% overpack, was determined by dividing 209 by the final height the foam achieves in the flow tube. After the foam was dispensed, the lid was clamped shut and the foam allowed to cure for 5 min. After 5 minutes, the lid was slowly opened and the part removed from the mold. After an additional 30 minutes, the thickness of the part was measured at the most center point of the part and the swell value calculated.

Results are set forth in Table 1 (reported results represent the average results of three replicate experiments). Examples 2, 4, 6, 8, 10, 12 and 14 are inventive examples and Examples 1, 3, 5, 7, 9, 11 and 13 are comparative examples. Flow index is min. fill density divided by the free-rise density.

TABLE 1

| Ingredient | Example 1 | 2 | 3 | 4 | 5 | 6 | 7 |
|---|---|---|---|---|---|---|---|
| POLYOL 1 | 33.04 | 33.04 | 31.36 | 31.36 | — | — | — |
| POLYOL 2 | — | — | — | — | — | — | — |
| POLYOL 3 | — | — | — | — | — | — | — |
| POLYOL 4 | — | — | — | — | 32.45 | 32.45 | 27.60 |
| POLYOL 5 | 22.12 | 22.12 | — | — | — | — | — |
| POLYOL 6 | — | — | — | — | — | — | — |
| POLYOL 7 | — | — | 27.80 | 27.80 | 29.66 | 29.66 | 24.00 |
| POLYOL 8 | — | — | — | — | — | — | — |
| POLYOL 9 | 18.36 | — | 10.41 | — | 10.86 | — | 17.17 |
| POLYOL 10 | — | — | — | — | — | — | — |
| POLYOL 11 | — | 18.36 | — | 10.41 | — | 10.86 | — |
| SURFACTANT 1 | 2.90 | 2.90 | 2.86 | 2.86 | 2.90 | 2.90 | 2.71 |
| SURFACTANT 2 | — | — | — | — | — | — | — |
| SURFACTANT 3 | — | — | — | — | — | — | — |
| CATALYST 1 | 0.90 | 0.90 | 0.87 | 0.87 | 0.85 | 0.85 | 0.84 |
| CATALYST 2 | 0.90 | 0.90 | 0.87 | 0.87 | 0.76 | 0.76 | 0.84 |
| CATALYST 3 | — | — | — | — | — | — | — |
| Water | 1.70 | 1.70 | 1.38 | 1.38 | 1.52 | 1.52 | 1.59 |
| BLOWING AGENT 1 | — | — | — | — | — | — | — |
| BLOWING AGENT 2 | 20.08 | 20.08 | 24.45 | 24.45 | 21.00 | 21.00 | — |
| BLOWING AGENT 3 | — | — | — | — | — | — | 25.25 |
| ISO 1 | 115 | 115 | 117 | 117 | 114 | 114 | 115 |
| ISO 2 | — | — | — | — | — | — | — |
| Index | 1.32 | 1.33 | 1.34 | 1.34 | 1.22 | 1.22 | 1.32 |
| Chemical Temperature (° C.) | 10 | 10 | 10 | 10 | 10 | 10 | 10 |
| Cream (sec) | 9 | 8 | 9 | 8 | 9 | 7 | 4 |
| Gel (sec) | 53 | 59 | 60 | 63 | 50 | 54 | 47 |
| Tack-Free (sec) | 59 | 65 | 65 | 67 | 55 | 76 | 55 |
| Free-Rise Density (lb/ft$^3$) | 1.63 | 1.72 | 1.56 | 1.71 | 1.83 | 1.80 | 1.85 |
| Min. Fill Density (lb/ft$^3$) | 1.84 | 1.85 | 1.89 | 1.91 | 1.86 | 1.88 | 1.74 |
| Packed Density (lb/ft$^3$) | 2.10 | 2.10 | 2.12 | 2.13 | 2.06 | 2.13 | 1.92 |
| Flow Index | 1.13 | 1.08 | 1.21 | 1.12 | 1.02 | 1.04 | 0.94 |
| Packed/Core Ratio | 1.14 | 1.11 | 1.15 | 1.14 | 1.08 | 1.10 | 1.04 |
| k-Factor (BTU- 35° F. | 0.128 | 0.129 | 0.128 | 0.124 | 0.119 | 0.116 | 0.125 |

TABLE 1-continued

| | | | | | | | | |
|---|---|---|---|---|---|---|---|---|
| in/h-ft²-° F.) | 75° F. | 0.149 | 0.148 | 0.149 | 0.140 | 0.134 | 0.131 | 0.136 |
| Closed Cell Content (%) | | 87.1 | 86.8 | 86.1 | 87.9 | 87.2 | 87.9 | 87.2 |
| Core Density (lb/ft³) | | 1.84 | 1.90 | 1.84 | 1.87 | 1.90 | 1.94 | 1.85 |
| Compressive | + | 23.1 | 24.1 | 22.6 | 23.7 | 20.3 | 21.2 | 16.9 |
| Strength (lb/in²) | = | 34.4 | 31.3 | 33.7 | 29.3 | 36.5 | 42.0 | 32.4 |
| | =/+Ratio | 1.5 | 1.3 | 1.5 | 1.2 | 1.8 | 2.0 | 1.9 |
| Dimensional | 1 Day @ −30° C. | 0.0 | −0.3 | −0.2 | −0.2 | 0.1 | −0.5 | −0.4 |
| Stability | 7 Days @ −30° C. | −0.1 | 0.0 | 0.1 | 0.1 | −0.2 | −0.5 | −0.4 |
| | 1 Day @ 70° C. | −1.1 | −1.2 | −1.2 | −1.2 | −0.8 | −1.6 | −0.5 |
| | 7 Days @ 70° C. | −1.2 | −0.8 | −0.7 | −0.5 | −1.1 | −1.9 | −0.9 |
| Swell Mold (25% OP, 30 min) | Packed Density (pcf) | 2.58 | 2.48 | 2.61 | 2.55 | n/a¹ | 2.58 | 3.20 |
| | Overpack (%) | 27.95 | 27.76 | 28.66 | 28.9 | n/a¹ | 18.01 | 24.1 |
| | Swell (in) | 0.244 | 0.200 | 0.133 | 0.078 | n/a¹ | −0.003 | 0.144 |

| | | Example | | | | | | |
|---|---|---|---|---|---|---|---|---|
| Ingredient | | 8 | 9 | 10 | 11 | 12 | 13 | 14 |
| POLYOL 1 | | — | — | — | — | — | — | — |
| POLYOL 2 | | — | 40.48 | 40.48 | — | — | — | — |
| POLYOL 3 | | — | 32.38 | 32.38 | 32.36 | 32.36 | — | — |
| POLYOL 4 | | 27.60 | — | — | — | — | 34.25 | 34.25 |
| POLYOL 5 | | — | — | — | — | — | — | — |
| POLYOL 6 | | — | — | — | 32.36 | 32.36 | — | — |
| POLYOL 7 | | 24.00 | — | — | — | — | 31.30 | 31.30 |
| POLYOL 8 | | — | — | — | 8.09 | 8.09 | — | — |
| POLYOL 9 | | — | 8.09 | — | — | — | 11.45 | — |
| POLYOL 10 | | — | — | — | 8.09 | — | — | — |
| POLYOL 11 | | 17.17 | — | 8.09 | — | 8.09 | — | 11.45 |
| SURFACTANT 1 | | 2.71 | — | — | — | — | 2.90 | 2.90 |
| SURFACTANT 2 | | — | 2.48 | 2.48 | — | — | — | — |
| SURFACTANT 3 | | — | — | — | — | — | — | — |
| CATALYST 1 | | 0.84 | 1.12 | 1.12 | 1.41 | 1.41 | 0.90 | 0.90 |
| CATALYST 2 | | 0.84 | — | — | — | — | 0.35 | 0.35 |
| CATALYST 3 | | — | 0.56 | 0.56 | 0.70 | 0.70 | — | — |
| Water | | 1.59 | 1.64 | 1.64 | 1.93 | 1.93 | 2.20 | 2.20 |
| BLOWING AGENT 1 | | — | 13.25 | 13.25 | 11.20 | 11.20 | — | — |
| BLOWING AGENT 2 | | — | — | — | — | — | 16.65 | 16.65 |
| BLOWING AGENT 3 | | 25.25 | — | — | — | — | — | — |
| ISO 1 | | 1.15 | — | — | 1.45 | 1.45 | 1.14 | 1.14 |
| ISO 2 | | — | 1.40 | 1.40 | — | — | — | — |
| Index | | 1.32 | 1.36 | 1.36 | 1.35 | 1.37 | 1.06 | 1.07 |
| Chemical Temperature (° C.) | | 10 | 25 | 25 | 20 | 20 | 10 | 10 |
| Cream (sec) | | 4 | 4 | 4 | 7 | 6 | 8 | 8 |
| Gel (sec) | | 56 | 35 | 37 | 34 | 37 | 37 | 35 |
| Tack-Free (sec) | | 77 | 53 | 55 | 85 | 92 | 71 | 76 |
| Free-Rise Density (lb/ft³) | | 1.67 | 1.75 | 1.74 | 1.58 | 1.61 | 1.85 | 1.66 |
| Min. Fill Density (lb/ft³) | | 1.84 | 1.78 | 1.84 | 1.87 | 1.79 | 1.54 | 1.76 |
| Packed Density (lb/ft³) | | 2.09 | 1.94 | 2.01 | 2.05 | 2.01 | 1.73 | 1.92 |
| Flow Index | | 1.10 | 1.02 | 1.06 | 1.18 | 1.11 | 0.83 | 1.06 |
| Packed/Core Ratio | | 1.07 | 1.10 | 1.12 | 1.13 | 1.10 | 1.03 | 1.03 |
| k-Factor (BTU- | 35° F. | 0.125 | 0.133 | 0.132 | 0.133 | 0.130 | 0.120 | 0.120 |
| in/h-ft²-° F.) | 75° F. | 0.132 | 0.145 | 0.144 | 0.144 | 0.142 | 0.137 | 0.137 |
| Closed Cell Content (%) | | 88.9 | 86.2 | 86.9 | 87.8 | 88.5 | 85.8 | 88.1 |
| Core Density (lb/ft³) | | 1.96 | 1.76 | 1.80 | 1.82 | 1.83 | 1.68 | 1.87 |
| Compressive | + | 21.1 | 14.8 | 16.8 | N/A | N/A | N/A | N/A |
| Strength (lb/in²) | = | 35.4 | 35.0 | 32.6 | N/A | N/A | N/A | N/A |
| | =/+Ratio | 1.7 | 2.4 | 1.9 | N/A | N/A | N/A | N/A |
| Dimensional | 1 Day @ −30° C. | −0.3 | 0.0 | −0.2 | N/A | N/A | N/A | N/A |
| Stability | 7 Days @ −30° C. | −0.3 | −0.1 | −0.1 | N/A | N/A | N/A | N/A |
| | 1 Day @ 70° C. | 0.3 | −0.7 | −0.5 | N/A | N/A | N/A | N/A |
| | 7 Days @ 70° C. | 0.9 | 0.8 | 1.0 | N/A | N/A | N/A | N/A |
| Swell Mold (25% OP, 30 min) | Packed Density (pcf) | 2.53 | 2.57 | 2.59 | 2.61 | 2.53 | 2.58 | 2.52 |

TABLE 1-continued

| | | | | | | | |
|---|---|---|---|---|---|---|---|
| Overpack (%) | 18.92 | 19.88 | 19.22 | 27.0 | 27.8 | 22.5 | 26.1 |
| Swell (in) | 0.120 | 0.060 | 0.098 | 0.141 | 0.146 | 0.014 | 0.008 |

[1]Data was not collected

Examples 15-20

Foam-forming compositions were prepared using certain formulations of Examples 1-14 as described in Table 2. Foams were prepared using a HK-100 high-pressure foam machine. The liquid output was maintained at a the temperatures for the Resin and for the Isocyanate side as set forth in Table 2 with an output range of 454 grams/second. Foam was shot into a 79"×8"×2" (200×20×5 cm) mold between heated platens with a target overpack of 10% based on minimum fill density. The platens were maintained at 49° C. The foam remained in the mold and was allowed to cure for 10 minutes at 49° C. before removing. An 8"×8"×1" section of foam was sampled from the panels and used for k-factor testing according to ASTM C518. Lid opening swell was determined by foaming the aforementioned mold at an overpack level of 10% and allowing the part to demold for 2 minutes. After 2 minutes, the lid clamps were removed and the lid allowed to open based on the degree of foam swelling. The degree of swelling was measured at 30 seconds, 180 seconds, and 300 seconds after the lid clamps were removed. Jumbo tool demold was determined by foaming a 70 cm×40 cm×9 cm closed mold via a shot port at a mold temperature of 45° C. with an amount of foam to achieve a foam density of either 2.10 or 2.30 pcf. After the foam was dispensed, the shot port was closed with a cork and the foam allowed to cure for the specified amount of time (1.5, 2, 3, or 4 minutes). After the specified demold time, the mold lid was opened and the part removed and allowed to rest overnight. After 24 hours, the thickness of the part was measured at the centermost point to determine the degree of foam swelling. Results are in Table 2.

TABLE 2

| | | Example | | | | | |
|---|---|---|---|---|---|---|---|
| | | 15 | 16 | 17 | 18 | 19 | 20 |
| Formulation (Example #) | | 9 | 10 | 3 | 4 | 5 | 6 |
| Chemical Temperature (Resin/Iso; ° F.) | | 90/90 | 90/90 | 70/80 | 70/80 | 70/80 | 70/80 |
| Cream (sec) | | Froth | Froth | Froth | Froth | Froth | Froth |
| Gel (sec) | | 26 | 28 | 37 | 38 | 30 | 29 |
| Free-Rise Density (lb/ft$^3$) | | 1.49 | 1.50 | 1.42 | 1.38 | 1.38 | 1.43 |
| Min. Fill Density (lb/ft$^3$) | | 2.13 | 2.07 | 1.99 | 1.92 | 2.05 | 2.05 |
| Packed Density (lb/ft$^3$) | | 2.35 | 2.28 | 2.18 | 2.11 | 2.28 | 2.26 |
| Flow Index | | 1.43 | 1.38 | 1.40 | 1.39 | 1.49 | 1.43 |
| Packed/Core Ratio | | 1.14 | 1.11 | 1.16 | 1.15 | 1.12 | 1.13 |
| k-Factor (BTU-in/h-ft$^2$-° F.) | 35° F. | 0.129 | 0.129 | 0.116 | 0.117 | 0.114 | 0.116 |
| | 75° F. | 0.139 | 0.138 | 0.131 | 0.133 | 0.129 | 0.131 |
| Closed Cell Content (%) | | 92.8 | 90.8 | 90.6 | 89.1 | 90.9 | 91.0 |
| Core Density (lb/ft$^3$) | | 2.06 | 2.06 | 1.88 | 1.83 | 2.04 | 2.00 |
| Compressive Strength (lb/in$^2$) | + | 26.4 | 24.8 | 18.9 | 17.4 | 22.7 | 20.2 |
| | = | 42.0 | 36.0 | 31.2 | 30.3 | 41.0 | 38.4 |
| | =/+Ratio | 1.6 | 1.5 | 1.7 | 1.7 | 1.8 | 1.9 |
| imensional Stability | 1 Day @ -30° C. | 0.0 | 0.0 | -0.2 | 0.0 | -0.2 | -0.2 |
| | 7 Days @ -30° C. | 0.0 | -0.3 | -0.1 | -0.3 | 0.2 | -0.1 |
| | 1 Day @ 70° C. | -0.5 | 0.0 | -1.1 | -1.2 | -1.5 | -1.3 |
| | 7 Days @ 70° C. | -0.1 | 0.1 | -0.4 | -0.2 | -0.9 | -0.1 |
| Lid Opening @ Freeze-Stable Density and 2 min Demold Time (in) | 0.5 | 0.078 | 0.094 | 0.148 | 0.137 | 0.066 | 0.034 |
| | 3.0 | 0.065 | 0.084 | 0.144 | 0.129 | 0.057 | 0.026 |
| | 5.0 | 0.057 | 0.078 | 0.135 | 0.123 | 0.051 | 0.021 |
| Lid Opening @ 10% Overpack; 2 min Demold Time (in) | 0.5 | 0.099 | 0.106 | 0.231 | 0.134 | 0.096 | 0.081 |
| | 3.0 | 0.086 | 0.097 | 0.223 | 0.126 | 0.089 | 0.073 |
| | 5.0 | 0.078 | 0.090 | 0.212 | 0.120 | 0.081 | 0.066 |
| Jumbo Tool Swell @ 2.10 pcf (mm) After 24 h | 1.5 | 5.6 | 5.9 | 7.8 | 5.3 | 10.2 | 5.4 |
| | 2.0 | 4.5 | 4.6 | 6.3 | 4.1 | 9.5 | 3.2 |
| | 3.0 | 3.5 | 3.0 | 3.1 | 2.0 | 8.1 | 2.0 |
| | 4.0 | 2.1 | 1.9 | 3.2 | 1.7 | 8.4 | 2.4 |
| Jumbo Tool Swell @ 2.30 pcf (mm) After 24 h | 1.5 | 8.0 | 8.0 | 12.9 | 8.3 | 11.5 | 7.5 |
| | 2.0 | 6.7 | 7.2 | 7.5 | 7.4 | 10.0 | 5.3 |
| | 3.0 | 5.2 | 4.8 | 5.5 | 4.0 | 8.9 | 4.4 |
| | 4.0 | 3.6 | 3.2 | 6.5 | 2.9 | 8.2 | 4.3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam-forming composition comprising:
   (a) a polyol blend comprising 0.1 to 50% by weight, based on the total weight of polyol, of an isopropylidenediphenol-based polyether polyol comprising:
      (1) an alkoxylate of 4,4'-isopropylidenediphenol;
      (2) an alkoxylate of 2,4'-isopropylidenediphenol, 2,2'-isopropylidenediphenol, or a mixture thereof, and
      (3) an alkoxylate of components comprising structural elements which are derived from phenol, acetone, isopropylidenediphenol, or a mixture of any two or more thereof, but which are not isomers of isopropylidenediphenol;
   (b) a blowing agent; and
   (c) a polyisocyanate that is present in an amount sufficient to provide an isocyanate index of 0.7 to 1.5,
   wherein the isopropylidenediphenol-based polyether polyol comprises an internal block comprising polymerized ethylene oxide moieties and an external cap comprising polymerized propylene oxide moieties, wherein ethylene oxide moieties are present in an amount of least 50% by weight, based on the total weight of the polymerized alkylene oxide moieties of the internal block of the isopropylidenediphenol-based polyether polyol and propylene oxide moieties are present in an amount of least 50% by weight, based on the total weight of the polymerized alkylene oxide moieties of the external cap of the isopropylidenediphenol-based polyether polyol.

2. The polyurethane foam-forming composition of claim 1, wherein the isopropylidenediphenol-based polyether polyol has a functionality of 1.5 to 3 and a measured hydroxyl number, as determined by ASTM D4274-16, of 200 to 300 mg KOH/g.

3. The polyurethane foam-forming composition of claim 1, wherein the isopropylidenediphenol-based polyether polyol further comprises an alkoxylate of a diol that has a molecular weight less than the molecular weight of isopropylidenediphenol and that does not contain structural elements derived from phenol, acetone and/or isopropylidenediphenol.

4. The polyurethane foam-forming composition of claim 1, wherein the isopropylidenediphenol-based polyether polyol is present in an amount of 10% to 30% by weight, based on the total weight of polyol.

5. The polyurethane foam-forming composition of claim 1, wherein the polyol blend further comprises an aromatic amine-initiated polyether polyol, wherein aromatic amine is present in an amount of more than 50% by weight, based on the total weight of H-functional starter used to produce the aromatic amine-initiated polyether polyol, and wherein the aromatic amine-initiated polyether polyol has a hydroxyl number of 200 to 600 mg KOH/g and a functionality of 3 to 5.

6. The polyurethane foam-forming composition of claim 5, wherein the aromatic amine-initiated polyether polyol is present in an amount of 20% to 80% by weight, based on the total weight of polyol.

7. The polyurethane foam-forming composition of claim 1, wherein the polyol blend further comprises a saccharide-initiated polyether polyol, wherein saccharide is present in an amount of more than 50% by weight, based on the total weight of H-functional starter used to produce the saccharide-initiated polyether polyol, and wherein the saccharide-initiated polyether polyol has a hydroxyl number of 200 to 600 mg KOH/g and a functionality of 4 to 6.1.

8. The polyurethane foam-forming composition of claim 7, wherein the saccharide-initiated polyether polyol is present in an amount of 20% to 80% by weight, based on the total weight of polyol.

9. The polyurethane foam-forming composition of claim 1, wherein the blowing agent comprises water and a physical blowing agent comprising a halogenated olefin and/or a hydrocarbon, wherein the physical blowing agent and the water are present in a relative ratio, by weight, of at least 5:1.

* * * * *